(12) United States Patent
Cosentino et al.

(10) Patent No.: US 12,172,747 B2
(45) Date of Patent: Dec. 24, 2024

(54) FLOW CONTROL DEVICE

(71) Applicants: AIRBUS OPERATIONS LIMITED, Bristol (GB); THE UNIVERSITY OF BRISTOL, Bristol (GB)

(72) Inventors: Enzo Cosentino, Bristol (GB); Catherine Llewellyn-Jones, Bristol (GB); Gaetano Arena, Bristol (GB); Rainer Groh, Bristol (GB); Alberto Pirrera, Bristol (GB)

(73) Assignees: AIRBUS OPERATIONS LIMITED, Bristol (GB); THE UNIVERSITY OF BRISTOL, Bristol (GB)

( * ) Notice: Subject to any disclaimer, the term of this patent is extended or adjusted under 35 U.S.C. 154(b) by 0 days.

(21) Appl. No.: 18/250,195

(22) PCT Filed: Sep. 29, 2021

(86) PCT No.: PCT/GB2021/052525
§ 371 (c)(1),
(2) Date: Apr. 21, 2023

(87) PCT Pub. No.: WO2022/084645
PCT Pub. Date: Apr. 28, 2022

(65) Prior Publication Data
US 2023/0391443 A1    Dec. 7, 2023

(30) Foreign Application Priority Data
Oct. 22, 2020    (GB) .................................... 2016757

(51) Int. Cl.
*B64C 23/00*    (2006.01)
*B64C 3/14*    (2006.01)
(Continued)

(52) U.S. Cl.
CPC .............. *B64C 23/005* (2013.01); *B64C 3/14* (2013.01); *B64C 3/26* (2013.01); *B64C 3/44* (2013.01);
(Continued)

(58) Field of Classification Search
CPC ....... B64C 23/005; B64C 23/076; B64C 3/14; B64C 3/26; B64C 3/44; B64C 3/58; B64C 2003/445
See application file for complete search history.

(56) References Cited

U.S. PATENT DOCUMENTS 5,433,404 A  *  7/1995  Ashill .................. B64C 3/48
                                                      244/200
6,173,924 B1 *  1/2001  Young .................. B64C 9/02
                                                      244/90 R
(Continued)

FOREIGN PATENT DOCUMENTS

EP    2908001    8/2015
GB    510546    8/1939
(Continued)

OTHER PUBLICATIONS

Combined Search and Examination Report for GB2016757.3 dated Jul. 6, 2021, 11 pages.
(Continued)

*Primary Examiner* — Tye William Abell
(74) *Attorney, Agent, or Firm* — Nixon & Vanderhye P.C.

(57) ABSTRACT

A flow control device on a structure such that strain in the structure is at least partially transferred to the flow control device is disclosed having at least two states, or shapes, separated by an elastic instability region. The flow control device is arranged to rapidly transition, or snap through, from the first state to the second state when strain in the structure exceeds an activation threshold of the flow control
(Continued)

device. A spoiler on an aerofoil has a rest position where it is substantially flush with the low pressure surface and an activated position where it protrudes from the low pressure surface and modifies the airflow over that surface. The spoiler bends to move from the rest position to the activated position when the strain in the aerofoil crosses a threshold. The deployed spoiler reduces the lift on the aerofoil, acting to reduce the lift induced strain of the aerofoil to which the spoiler is attached.

28 Claims, 21 Drawing Sheets

(51) Int. Cl.
    *B64C 3/26*     (2006.01)
    *B64C 3/44*     (2006.01)
    *B64C 3/58*     (2006.01)
    *B64C 23/06*     (2006.01)

(52) U.S. Cl.
    CPC .............. *B64C 3/58* (2013.01); *B64C 23/076* (2017.05); *B64C 2003/445* (2013.01)

(56) References Cited

U.S. PATENT DOCUMENTS

| | | | | |
|---|---|---|---|---|
| 6,276,641 | B1* | 8/2001 | Gruenewald | B64C 3/48 |
| | | | | 244/219 |
| 8,788,122 | B1* | 7/2014 | Sankrithi | B64C 23/076 |
| | | | | 701/13 |
| 2006/0186269 | A1* | 8/2006 | Kota | B63H 3/002 |
| | | | | 244/123.1 |
| 2008/0226448 | A1* | 9/2008 | Altmikus | B64C 27/001 |
| | | | | 416/23 |
| 2011/0084174 | A1* | 4/2011 | Hemmelgarn | F03D 1/0675 |
| | | | | 416/241 R |
| 2014/0291453 | A1* | 10/2014 | Sankrithi | G05D 1/0066 |
| | | | | 244/199.4 |
| 2016/0229519 | A1* | 8/2016 | Dilligan | B64C 9/16 |
| 2016/0369775 | A1* | 12/2016 | Gonzalez | F03D 7/0236 |
| 2021/0286909 | A1* | 9/2021 | Vidoli | G06F 30/10 |

FOREIGN PATENT DOCUMENTS

| | | |
|---|---|---|
| WO | 2016018477 | 2/2016 |
| WO | 2019244096 | 12/2019 |

OTHER PUBLICATIONS

International Search Report and Written Opinion of the ISA for PCT/GB2021/052525 mailed Jan. 5, 2022, 12 pages.

Gaetano Arena et al., "A Tailored Nonlinear Slat-Cove Filler for Airframe Noise Reduction", Conference Paper—Research Gate, https://www.researchgate.net/publication/327690839, Sep. 2018, 14 pages.

Stephen Daynes et al., "A morphing trailing edge device for a wind turbine", Journal of Intelligent Material Systems and Structures—Research Gate, https://www.researchgate.net/publication/254116237, Apr. 2012, vol. 6, No. 23, 12 pages.

* cited by examiner

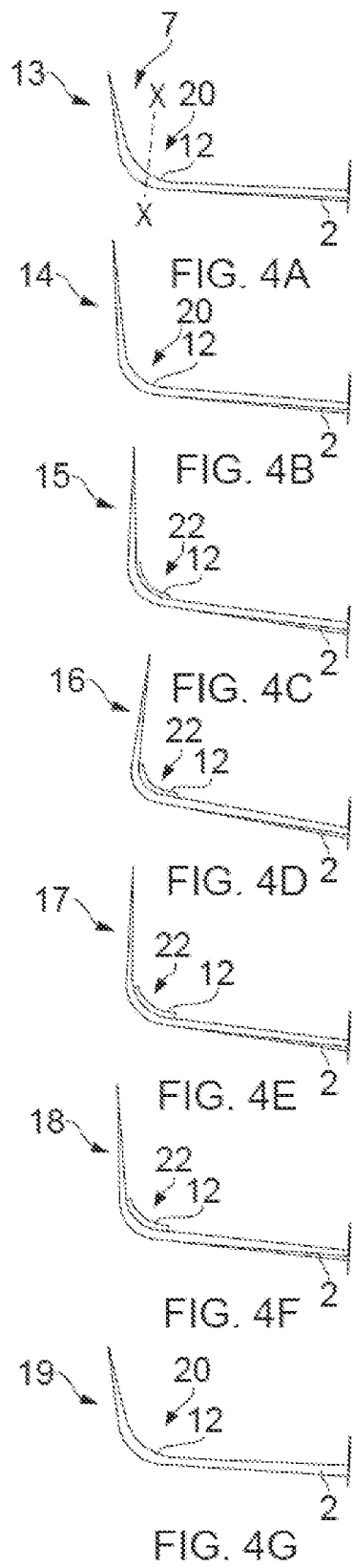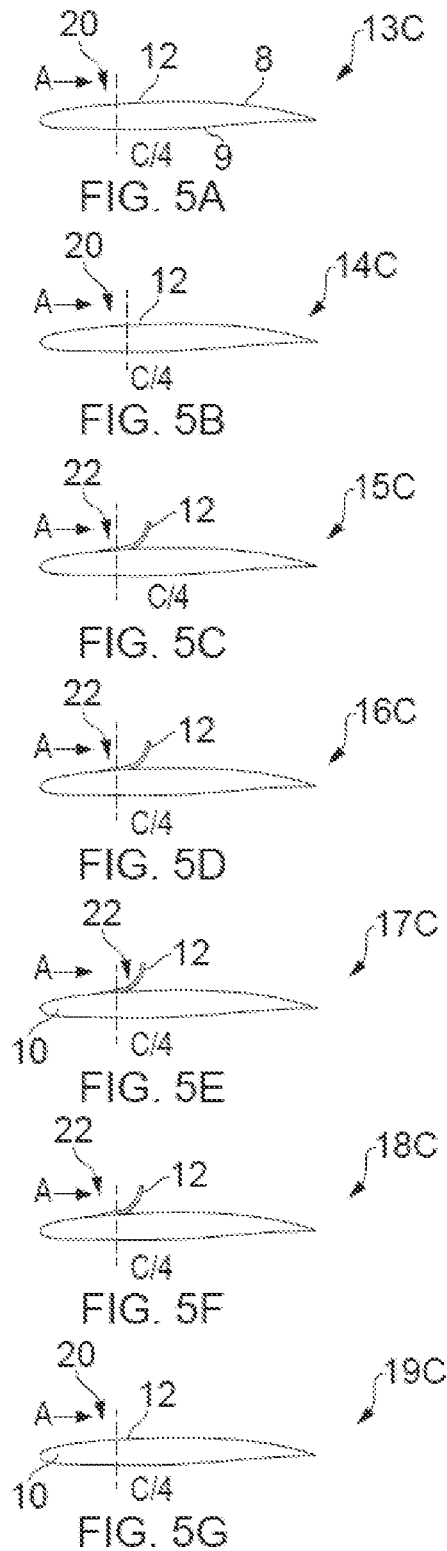

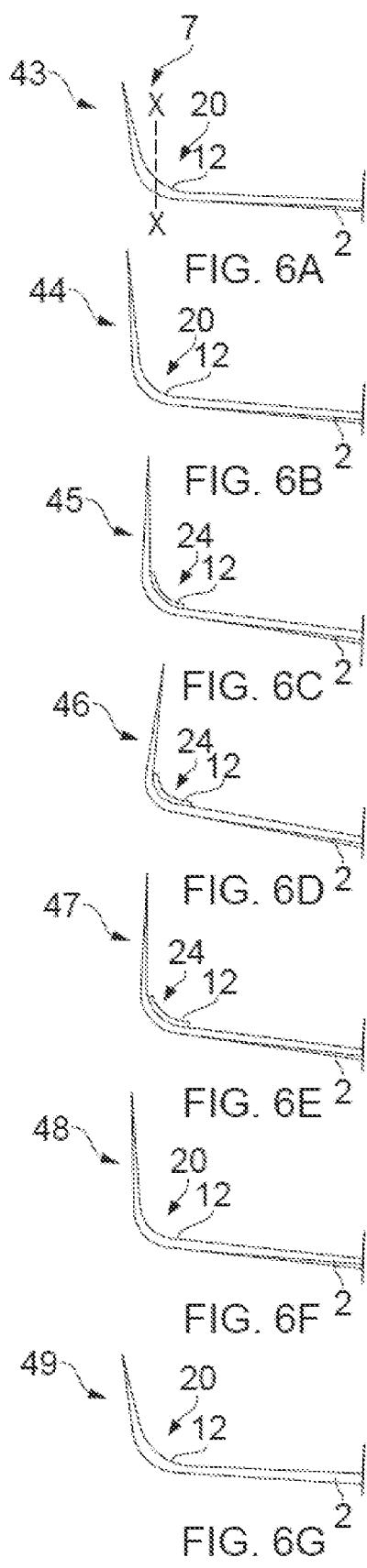
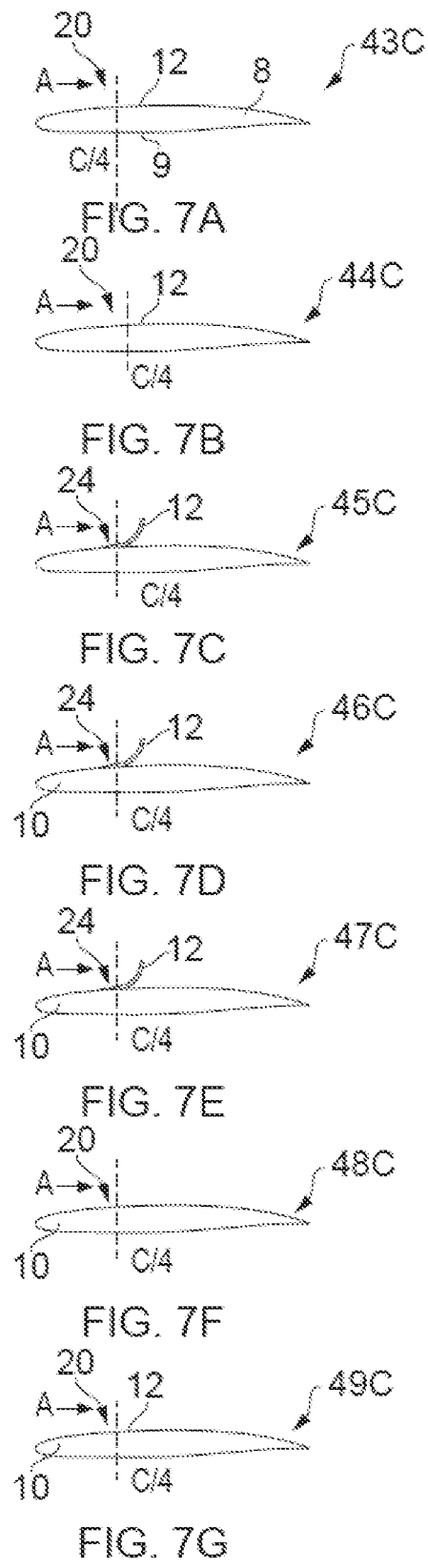

FLOW CONTROL DEVICE

CROSS REFERENCE TO RELATED APPLICATIONS

The present application is a National Phase of International Application Number PCT/GB2021/052525 filed Sep. 29, 2021, which designated the U.S. and claims priority benefits from Great Britain Application Number GB 2016757.3, filed Oct. 22, 2020, the entire contents of each of which are hereby incorporated by reference.

FIELD OF THE INVENTION

The present invention relates to a flow control device arranged on a structure, an aircraft wing or wing tip device including the flow control device, a method of controlling air flow over an aerofoil, an aerofoil having a spoiler, and a method for providing a spoiler on an aerodynamic surface.

BACKGROUND OF THE INVENTION

A variety of morphing, or adaptive, structures are known which exhibit large scale shape changes, whilst maintaining load bearing capability, in response to external stimuli. Morphing structures can be especially useful in aerodynamics for flow control. Of particular interest are morphing structures that do not require active control to change shape.

Shape adaptation can exploit structural elastic instabilities. Elastic instability refers to a temporary loss of stiffness of a structure, which is restored before irreversible deformation occurs. From a primary, or fundamental, stable state a structure can be designed to reach an unstable equilibrium. From this unstable equilibrium the structure will 'snap through' to a secondary state. A post-buckled structure is 'multi-stable' if it has at least two stable equilibrium states. A 'bi-stable' structure has two stable equilibrium states and an intermediate unstable equilibrium state. From the primary stable state the structure will snap through to the secondary stable state and will remain in the secondary stable state even when the external stimulus is removed. Application of an external stimulus when in the secondary stable state can reverse the shape change back to the primary stable state with snap through. A 'mono-stable' structure can still exhibit snap through behaviour but the second state is a steady (or quasi stable) but not stable state and so the structure will return to the primary state upon removal of the external stimulus.

In morphing flow control devices thermal, electrical (e.g. piezo-electric) and aerodynamic pressure loads are known to be used as the external stimulus. For example, thermally activated flow devices on a jet engine cowling can aid in acoustic noise suppression.

It is desirable to make aircraft components as light as possible in order to improve fuel efficiency and take-off performance. In the case of aerodynamic components such as wings, there is often limited scope to reduce the weight of the wing since it must withstand significant loading as well as sudden gusts of wind e.g. during turbulence. Accordingly providing gust load alleviation can enable the weight of the wing to be reduced without impairing its ability to resist sudden gusts of wind. For gust load alleviation on an aircraft wing using a morphing flow control device actuated by the aerodynamic pressure loads, accurately predicting the magnitude of the localised loads generated by a gust can be difficult. Also, under certain manoeuvres the aerodynamic pressure loads can be similar to a gust load scenario, therefore potentially triggering unwanted snap through phenomena.

SUMMARY OF THE INVENTION

According to an aspect of the invention, there is provided a flow control device with a device aerodynamic surface arranged on a structure with a structure aerodynamic surface such that strain in the structure is at least partially transferred to the flow control device, the flow control device having a first state corresponding to a first shape of the device aerodynamic surface, and a second state corresponding to a second shape of the device aerodynamic surface, wherein the first state is a stable state of the flow control device and the second state is either a steady state or a second stable state of the flow control device, and the flow control device is arranged to rapidly transition from the first state to the second state when strain in the structure exceeds an activation threshold of the flow control device.

A flow control device is something that controls the direction of air flow over a structure. In an aircraft, this may be a vortex generator, spoiler, vane, vent, etc.

Here, rapid transition refers to the 'snap through' change from the first stable state to the second stable or steady state in a short period of time. It is a near step change between the first and second shapes of the flow control device through an intermediate unstable equilibrium state. The time period may be of the order of tenths of a second or shorter.

If the flow control device has a stable second state in addition to the first stable state then, the flow control device is multi-stable. In each stable state the flow control device may elastically deform when loaded. When the load is removed, the flow control device may elastically recover in whichever of the first or second states it has just been deformed from.

From the first stable state, the flow control device may elastically deform up to an intermediate unstable equilibrium state as strain in the structure increases up to the activation threshold. At the activation threshold the flow control device rapidly transitions to the second stable state. Reduction of strain in the structure will initially leave the flow control device in the second stable state.

A further external stimulus may be required to return the flow control device from the second stable state to the first stable state, depending on the potential energy level of the first and second states as well as the potential energy threshold between them. In some cases, once strain in the structure is low enough, airflow over the flow control device may be sufficient to return it to the first state. In others, an external stimulus could be provided by an actuator. A further alternative is that the external stimulus could be provided manually once the aircraft has landed.

Alternatively, the flow control device may be self-returning once strain in the structure is low enough. This could be provided by negative strain e.g. by the structure bending in the opposite direction to that which triggers the snap through change to the second state.

The potential energy level of the first and second states may be the same or different. The potential energy level of the first state may be lower than the potential energy level of the second state, e.g., the energy input required to reach the activation threshold from the first state towards the second state may be higher than the energy input required to reach the (reverse) activation threshold from the second state towards the first state. An external force imparted by the external stimulus on the flow control device may be dependent on operating conditions. For example, when applied to an aircraft, the airflow over the aircraft wing may apply a greater external stimulus (returning force) to the flow control device when the aircraft is at high speed than when the aircraft is at low or zero speed. Therefore, at one operating condition (e.g. low airspeed) the flow control device may behave as a multi-stable device, but at another operating condition (e.g. high airspeed) the flow control may tend not to remain in the second stable state due to the external stimulus—so behaving similarly to a mono-stable device.

If the flow control device has a steady (or quasi stable) second state in addition to the first stable state, but no second stable state, the flow control device is mono-stable. This quasi steady state may correspond to a local dip or flattening of the energy level in a potential energy/deflection plot. In the first stable state the flow control device may elastically deform when loaded. When the load is removed, the flow control device may elastically recover in the first state. From the first stable state, the flow control device may elastically deform up to an intermediate unstable equilibrium state at which the activation threshold is reached when an external stimulus is applied. At the activation threshold the flow control device rapidly transitions to the second state. Since the second state is not stable but only steady, or quasi stable, removal of the external stimulus may cause the flow control device to return to the first stable state by rapidly transitioning through the intermediate unstable equilibrium state from the second state. In the second state the flow control device may still elastically deform when loaded.

The flow control device may only change from the first stable state to the second state when sufficient strain has been transferred to the flow control device. The strain in the structure may be induced due to bending, deformation or movement of the structure and this strain in the structure will be at least partially transferred to the flow control device. When the strain in the structure local to the flow control device reaches or exceeds a threshold value, T, corresponding to the activation threshold the flow control device will change from the first state to the second state.

An advantage of using strain in the structure as the external stimulus for activation of the flow control device from the first state to the second state is that, unlike local aerodynamic loads which can be difficult to predict, deformation and associated strain levels in the structure can be accurately modelled. The flow control device can therefore be designed to be actuated at a specified strain level, unique to the structure, or part of the structure, that the flow control device will be used on. The activation from the first state to the second state using the strain can also be purely passive.

The first shape of the device aerodynamic surface may be substantially flush with the structure aerodynamic surface. In the first shape the flow control device may conform to the contours of the structure locally. In the first shape the flow control device may be integrated into the structure without any appreciable aerodynamic step between the device aerodynamic surface and the structure aerodynamic surface. This enables the airflow over structure aerodynamic surface to be uninterrupted by the flow control device.

The second shape of the flow control device may be such that it is bent away from the structure and towards an oncoming flow direction.

The device aerodynamic surface may have an aerodynamic leading edge (which may be integrated into the structure) and an aerodynamic trailing edge. The device aerodynamic surface may be adapted to curl into the second shape such that the device aerodynamic trailing edge sits away from the structure aerodynamic surface. In the second shape the device aerodynamic surface may be curved in cross section. This enables the flow control device surface to disrupt the airflow over the structure aerodynamic surface.

If the structure aerodynamic surface is an aerodynamic lifting surface, then the flow control device may act to spoil the lift of the structure aerodynamic surface when in the second shape. The act of spoiling the lift may have the effect of reducing the strain in the structure to below the activation threshold. The flow control device may be configured to return to the first stable state when the strain in the structure is reduced below the activation threshold as a result of the lift reduction. This may occur due to hysteresis of the flow control device. The flow control device may delay in returning to the first stable state until the strain in the structure reduces to a second strain threshold, or there may be a time delay after the strain is reduced below the activation threshold.

The flow control device may be configured to provide aerodynamic loads alleviation or reduction to the structure. The structure may be strained due to aerodynamic loads. When the strains in the structure reach the activation threshold the flow control device may change from the first state to the second state and in doing so may reduce the aerodynamic loads on the structure.

The activation threshold of the flow control device may be tuneable. The activation threshold may be predetermined. The activation threshold may be tuned to the strains expected or predicted to be experienced by the structure, or the part of the structure directly physically coupled to the flow control device.

The flow control device may be a panel, in particular a thin sheet or plate, preferably having three dimensional curvature.

The activation threshold may be tuned by selecting one or more of the thickness, material, shape, layup (if a laminate), fibre ply direction (if a fibre reinforced composite), prestress, etc. of the flow control device.

The flow control device may have a first activation threshold to transition from the first state to the second state. The flow control device may have a second activation threshold to transition from the second state to the first state. The first and second activation thresholds may be the same, similar or dissimilar. Where the activation thresholds are dissimilar the flow control device may exhibit significant strain activation hysteresis between the first and second states, that is to say the device may deploy at a first strain threshold and then remain deployed until the strain in the wing had dropped to a significantly lower second strain threshold.

The flow control device may be configured so that the second, steady state is maintained only by the strain in the structure remaining above the activation threshold.

The flow control device may be configured to return to the first state once the strain in the structure decreases below the activation threshold.

The flow control device maybe configured to automatically return to first stable state once the strain in the structure decreases below the activation threshold, e.g. the device is mono-stable.

Alternatively, the flow control device may be configured to at least initially remain in the second, stable state when the strain in the structure decreases below the activation threshold, e.g. the device is multi-stable.

The flow control device may not automatically return to the first stable state from the second state, even when the strain in the structure is reduced below or significantly below the activation threshold. The strain in the structure may be in a direction transverse to an oncoming airflow direction.

There may be a plurality of the flow control devices on the structure.

The flow control device aerodynamic surface may be generally rectangular in the first state, and preferably, the short side of the rectangle extends generally parallel to an oncoming flow direction.

The flow control device aerodynamic surface may generally take any shape, e.g. any regular shape or any irregular shape, when viewed in planform.

The flow control device may have a proximal end towards an oncoming flow direction, and the proximal end of the flow control device may be attached to or integrally formed with the structure. Lateral and/or distal edges (take with respect to the oncoming flow direction) of the device aerodynamic surface may be free, e.g. not directly coupled to the structure. These free edges may permit the device aerodynamic surface to bend away from the structure.

The flow control device may be retrofitted onto an existing structure, e.g. a cut out may be made into the structure aerodynamic surface to accommodate the flow control device, or could be provided on the structure and be aerodynamically blended with the aerodynamic surface of the structure. More typically, the flow control device will be designed and tuned with a new structure.

The flow control device may be attached to the structure by mechanical means, such as but not limited to, bolting, riveting and fastening. Alternatively, the flow control device may be attached by adhesive or bonding means.

Alternatively, the proximal end of the flow control device may be integrally formed with the structure. Integrally forming the flow control device with the structure may avoid any join between the structure aerodynamic surface and the device aerodynamic surface in the flow direction, and may also save weight.

The flow control device may have a distal end opposite the proximal end. The distal end may be unattached to the structure such that the flow control device is cantilevered from the structure by its proximal end.

The strain in the structure may be at least partially transferred to the flow control device through the attached or integrally formed proximal end of the flow control device.

In the second shape, the device aerodynamic surface may be spaced away from the structure so that an oncoming airflow can flow between the flow control device and the structure.

In the second shape, the device aerodynamic surface may define an archway for the oncoming airflow to pass through.

The flow control device may be attached or integrally formed with the structure at at least two points.

The flow control device may be attached to or integrally formed with the structure along lateral edges of the flow control device extending generally parallel with the oncoming airflow.

In the second shape, the device aerodynamic surface may be depressed below the surrounding structure aerodynamic surface to define a recess, so that an oncoming airflow can flow into the recess.

The recess may be formed as a channel extending generally transverse to the oncoming flow direction.

The flow control device may further comprise at least two of the flow control devices arranged spaced in the direction of the oncoming airflow, and with a duct formed in the structure beneath the structure aerodynamic surface, such that a first one of the two flow control devices forms a first opening to the duct when the device aerodynamic surface of the first flow device is depressed below the surrounding structure aerodynamic surface, and a second one of the two flow control devices forms a second opening to the duct when the device aerodynamic surface of the second flow device is depressed below the surrounding structure aerodynamic surface, so that the oncoming airflow can flow through the duct.

The flow control device may be attached or integrally formed with the structure at at least two points.

The flow control device may be attached to or integrally formed with the structure along lateral edges of the flow control device extending generally parallel with the oncoming airflow.

The flow control device may have a proximal end that is generally curved or generally straight.

The flow control device aerodynamic surface may have a planform shape that is generally crescent shaped, generally triangular, generally scallop shaped, generally rectangular or generally trapezoidal.

The structure may comprise a composite or metallic material. Where the structure includes composite material, the composite may be a laminate and the flow control device may form part of the laminate lay-up.

Integrally forming the flow control device with the structure may reduce the manufacturing steps to create the structure/device, may save weight and may reduce parts count.

Alternatively, the structure may comprise an isotropic material, such as metal.

The flow control device may comprise anisotropic material.

The flow control device may comprise a laminate material. The flow control device may comprise a pre-stressed isotropic material.

The isotropic flow control device may be pre-stressed by a variety of processes, e.g. bending or shot peening. The pre-stressed flow control device may be attached to the structure in a stressed condition, or may be pre-stressed separately from the structure and integrally formed with the structure. The flow control device may be pre-stressed during installation on the structure, e.g. by bending (stressing) the structure, attaching the flow control device, and then releasing the structure so it relaxes and stresses the flow control device as it relaxes.

The structure may form part of an aerofoil.

The aerofoil may be adapted to generate lift when moving relative to an air flow. In the second state the flow control device may be configured to interact with the air flow around the aerofoil to reduce the lift generated by the aerofoil as compared with the lift generated by the aerofoil when the flow control device is in the first state.

The structure aerodynamic surface may be a low pressure surface of the aerofoil. Alternatively, the structure aerodynamic surface may be a high pressure surface of the aerofoil. An aerofoil may have a respective flow control device on each of the high and low pressure surfaces.

The structure having the low pressure surface may be configured to support compressive strain when the aerofoil generates lift, and the flow control device may be configured to rapidly transition from the first state to the second state when compressive strain in the structure exceeds the activation threshold due to the lift generated by the aerofoil.

The flow control device may be a lift spoiler. The flow control device may be an aileron, a vortex generator, a vane, a vent, etc.

The structure may be on an aircraft (fixed wing, rotary wing or tilt-rotor), land vehicle, or a space vehicle (for use when in an atmosphere).

The spoiler may be arranged approximately at a quarter chord position of the aerofoil.

Alternatively, the spoiler may be arranged towards the leading edge of the aerofoil, forward of the quarter chord position, or may be arranged towards the trailing edge of the aerofoil, aft of the quarter chord position.

The flow control device on a structure may be on an aircraft wing or wing tip device. Strain in the wing/wing tip device may be caused by loading of the aircraft wing. Loading may be aerodynamic loads or other external loads. The strain may be induced by bending, deformation or movement of the structure.

The flow control device may be arranged at a transition region between the aircraft wing and an upwardly projecting portion of the wing tip device.

The transition region is the area of a wing which experiences the most up and down deflection relative to the fuselage.

In a further aspect of the invention there is a method of controlling air flow over an aerofoil having a morphing flow control device, the method comprising: operating the aerofoil to induce strain in a structure of the aerofoil; and harnessing the strain in the structure to activate a morphing flow control device arranged on the structure to rapidly transition from a first stable state to a second stable or steady state when a strain level of the flow control device exceeds a threshold due to increased strain in the structure, wherein the first state corresponds to a first shape of a device aerodynamic surface, and the second state corresponds to a second shape of the device aerodynamic surface.

The strain in the structure may be in a direction transverse to an oncoming airflow direction.

The second state of the flow control device may interact with the air flow over the aerofoil to reduce the lift generated by the aerofoil as compared with the lift generated by the aerofoil when the flow control device is in the first state.

In a further aspect of the invention, an aerofoil comprises a low pressure surface with a spoiler arranged on the low pressure surface, the spoiler having a rest position where it is substantially flush with the low pressure surface and an activated position where it protrudes from the low pressure surface and modifies the airflow over that surface; wherein the spoiler is a device having a stable state in the rest position and a stable or quasi-stable state in the activated position; the spoiler bends to move from the rest position to the activated position; and the coupling of the spoiler to the aerofoil transfers at least some strain from the aerofoil to the spoiler and the movement of the spoiler is triggered by the strain in the aerofoil crossing a threshold.

In a further aspect of the invention, there is provided a method for arranging a spoiler to an aerodynamic surface by: providing an aerodynamic surface; and providing a spoiler having a first state corresponding to a first shape of the spoiler, and a second state corresponding to a second shape of the spoiler, wherein the first state is a stable state of the spoiler and the second state is either a steady state or a second stable state of the spoiler, wherein the spoiler has a proximal end towards an oncoming flow direction, and the proximal end of the spoiler is attached to or integrally formed with the aerodynamic surface, wherein the spoiler is arranged to rapidly transition from the first state to the second state when strain in the aerodynamic surface is transferred to and exceeds an activation threshold of the spoiler such that strain in the aerodynamic surface is transferred to the spoiler causing the spoiler to bend away from the aerodynamic surface.

BRIEF DESCRIPTION OF THE DRAWINGS

Embodiments of the invention will now be described with reference to the accompanying drawings, in which:

FIGS. 4A-4G show front views of the aircraft wing of the first example bending upwardly during different load conditions with corresponding deployment of the flow control device;

FIGS. 5A-5G show the corresponding cross sections of the aircraft wing through the flow control device relating to FIGS. 4A-4G;

FIGS. 6A-6G show front views of the aircraft wing according to a second example bending upwardly during different load conditions with corresponding deployment of the flow control device;

FIGS. 7A-7G show the corresponding cross sections of the aircraft wing through the flow control device relating to FIGS. 6A-6G;

DETAILED DESCRIPTION OF EMBODIMENT(S)

Figure 1:
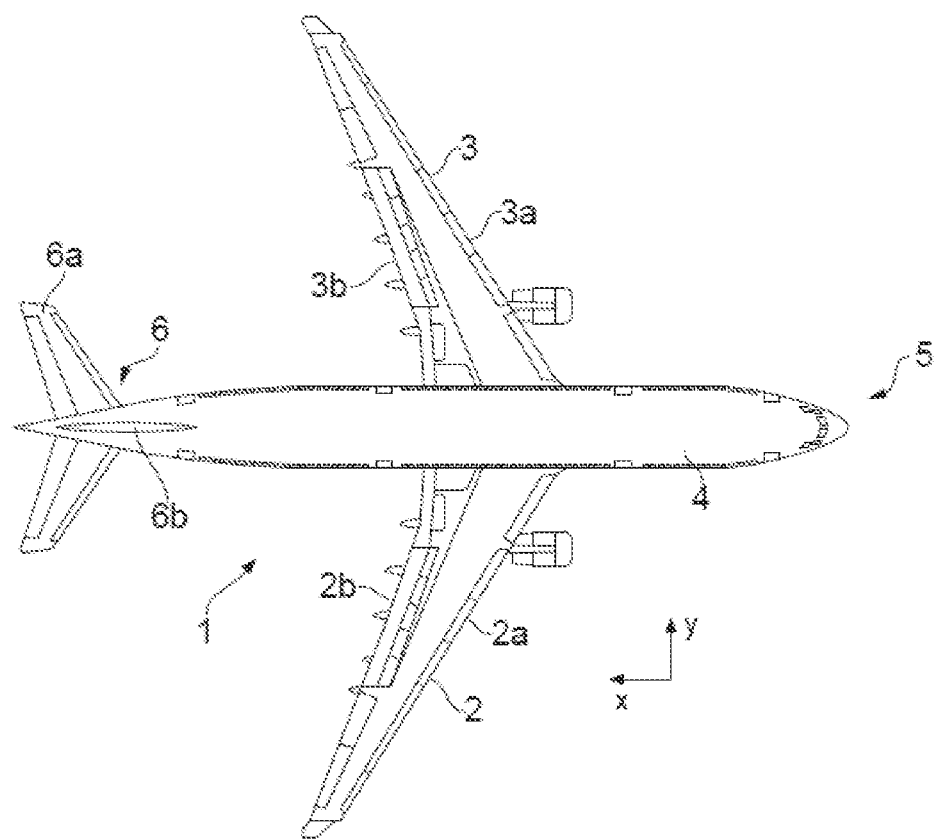
FIG. 1 is a plan view of an aircraft.

FIG. 1 shows an aircraft 1 with port and starboard fixed wings, 2, 3, a fuselage 4 with a nose end 5 and a tail end 6 including horizontal and vertical stabilising surfaces 6a, 6b. Each wing has a leading edge 2a, 3a and a trailing edge, 2b, 3b. The aircraft 1 is a typical jet passenger transonic transport aircraft but the invention is applicable to a wide variety of fixed wing aircraft types, including commercial, military, passenger, cargo, jet, propeller, general aviation etc. with any number of wings attached to the wings or fuselage. Indeed the invention can be applied to a wide variety of industries requiring aerodynamic flow control, including aerospace, space, automotive, wind turbine, sailing and other industries.

Figure 2:
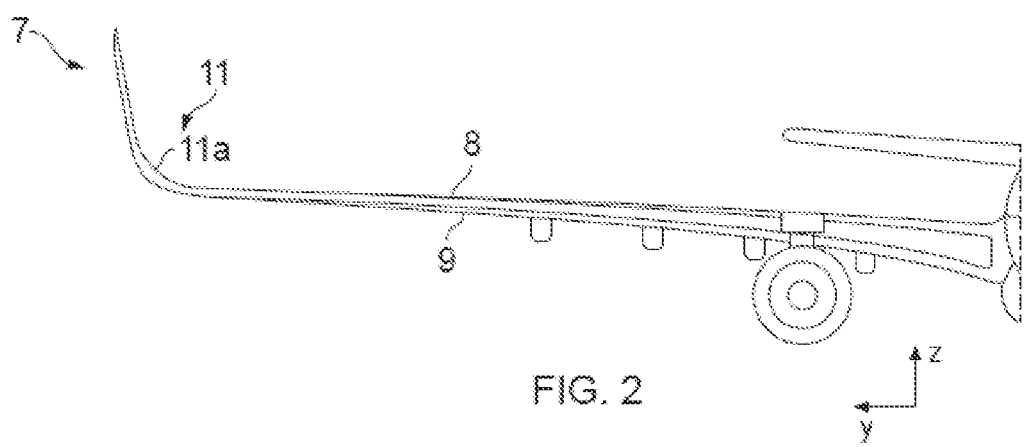
FIG. 2 shows a front view looking aft of the aircraft wing.

The axes shown in FIGS. 1 and 2 represent the usual reference orthogonal axes of the aircraft 1. The X-axis defines the longitudinal fore-aft direction of the aircraft; the Y-axis defines the spanwise direction and the Z-axis defines the vertical up-down direction of the aircraft.

Each wing 2, 3 of the aircraft has a cantilevered structure with a length extending in a spanwise direction from a root to a tip, the root being joined to the aircraft fuselage 4. The wing portion near the root is the inboard region. The wing portion near the tip is called the outboard region. The wing has an upper surface 8 and lower surface 9. At the tip end of each wing 2, 3 is a wing tip device 7 outboard of a main portion of the wing. The wing tip devices are used to reduce the induced drag of the aircraft.

Different aircraft have varying wing tip device 7 designs. Between the main portion of the wing and the wing tip device 7, there exists a transition region 11. This transition region ensures that the aerodynamic profile between the wing and the wing tip device is maintained by smooth surface blending. The wing tip device has a generally upward projecting portion. The angle (with respect to the vertical) of the generally upward projecting portion is known as the cant angle. This cant angle may vary for different wing tip devices. The upper surface of the transition region 11a is a smoothly upwardly curved surface. Alternatively, the wing may have a different wing tip device configuration, e.g. a wing tip fence, dropped wingtip, 'sharklet' or raked wingtip winglet design or other known design.

The wing has an outer aerodynamic surface. The wings 2, 3, are aft swept and have a number of aerodynamic flight control surfaces. Flight control surfaces can be adjusted during flight to adjust the aircraft flight attitude or wing performance. There are a number of flight control surfaces, such as ailerons, elevator, rudders, spoilers, flaps, slats and air brakes. These are typically located on the wing 2, 3 or on the horizontal stabiliser 6a or vertical stabilisers 6b of the aircraft 1.

During flight, the wing experiences aerodynamic and inertial loading. The wing 2, 3 exhibits aeroelastic behaviour. For example, the wing flexes upwardly in the Z axis direction as the wing experiences increased aerodynamic lifting forces. The wing has an aerofoil profile with the lower wing cover experiencing higher pressure while the upper wing cover experiences lower pressure. Extreme weather conditions, such as extreme gust, also causes the wing 2, 3 to deflect and deform in the up-down direction. The upward flexure of the wing 2, 3 causes the upper cover 8 to compress, while the lower cover 9 to be under tension. As the wing tip device 7 deflects upward, the strain in the wing increases. The wing 2, 3 experiences strain due to the bending, deflection and other movement due to the external forces exerted on the wing. Flight control surfaces are may be used to limit the amount of strain experienced by the aircraft by controlling the airflow over the aerodynamic surfaces of the aircraft. For example, spoilers and ailerons may be used on an aircraft wing to reduce the lift experienced by the aircraft, so-called loads alleviation function.

Figure 3:
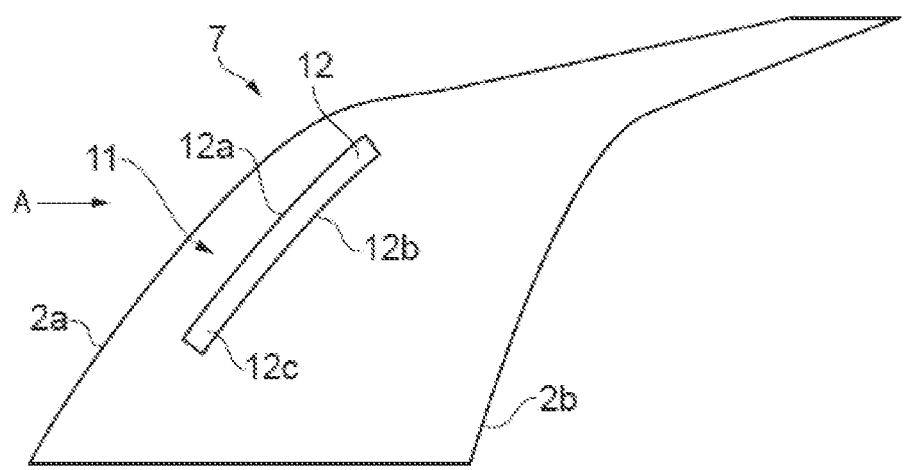
FIG. 3 shows a plan view of an outboard portion of the aircraft wing with a wing tip device and a flow control device according to a first example.

The main lift spoilers are typically found on the trailing edge of the 2b, 3b of the aircraft wings just forward of the flaps. As shown in FIG. 3, a further flow control device 12 is located on the curved wing upper surface of the transition region 11a between the wing tip and the upwardly projecting portion of the wing tip device 7. The flow control device 12 shown in FIG. 3 is configured as a lift spoiler. During upward flexure of the wing 2, e.g. during an extreme gust, the upper surface of the transition region 11a experiences relatively large deflection and deformation. Consequently, the region 11a experiences (compressive) strain.

Preferably, the flow control device, spoiler, 12 is located at approximately the quarter chord line of the local aerofoil profile of the aircraft wing 2, as shown in FIG. 6A. The quarter chord line, C/4, is approximately the point at which the resultant aerodynamic force acts. That is, the area where most of the lift is generated on the aerofoil. This enables the spoiler 12 to disrupt the location of maximum lift of the wing and so locating the spoiler here is most effective at reducing lift when the spoiler is deployed.

The spoiler 12 has a proximal end 12a and a distal end 12b. The proximal end 12a of the spoiler is attached to the wing 2/wing tip device 7 at the upper surface of the transition region 11a. The proximal end 12a may be attached by mechanical means, for example, bolting. Alternatively, the proximal end may be integrally formed with the aircraft wing surface. The proximal end 12a of the spoiler is towards an oncoming air flow direction, A. Distal end 12b is unattached to the aircraft wing surface, i.e. it is cantilevered. The spoiler has an upper (outer, aerodynamic) surface, 12c and a lower (inner, reverse) surface 12d (not shown in FIG. 3). In this example, the spoiler 12 is generally rectangular in planform, as shown in FIG. 3. The proximal and distal ends 12a, 12b of the spoiler 12 may have aerodynamic leading and trailing edges which are slightly curved in planform.

The first stable state 20 of the spoiler 12 is shown in FIG. 3. The shape of the spoiler 12 is substantially similar, or conformal, to the local shape of the wing 2/wing tip device 7 on which it is arranged. The upper surface 12c of the spoiler has a shape that corresponds or conforms to the local surrounding aerodynamic surface of the wing 2/wing tip device 7. The spoiler 12 is substantially flush with the aerodynamic surface of the wing 2/wing tip device 7 when in the first state. It will be understood that the spoiler 12 may be placed at any location along the length of the wing 2. Regardless of position along the wing, the upper surface 12c of spoiler 12 will have a substantially similar shape to match the aerodynamic curvature of the aerofoil portion of the structure on which the spoiler is arranged when in the first state.

As the wings 2, 3 are similar in construction, the wing 3 will have a similarly arranged flow control device for symmetry with the wing 2.

FIGS. 4A-4G show front views of an aircraft wing with a spoiler 12 in a first example. This example relates to a spoiler arranged to form a bi-stable system. FIGS. 4A to 4G show the aircraft wing at various degrees of upward deflection, e.g. in response to increasing lift generated by the wing. FIG. 4A shows the wing 2 and wing tip device 7 at an initial position 13, and FIGS. 4B though 4D show the wing moving progressively through positions 14 and 15 to a position of maximum upward deflection 16 accompanied by a corresponding reduction of (or even negative) cant angle of the upwardly projecting portion of the wing tip device 7. FIGS. 4E-4G show the wing returning back through positions 17 and 18 to the initial position 19, as the wing deflection reduces, e.g. due to reduced wing loading.

FIGS. 5A to 5G show the corresponding cross-section (through X-X of FIG. 4A) of the wing at each deflection position 13-19 shown in FIGS. 4A-4G. Each corresponding cross section has the same reference numeral, but has a 'C' after the deflection position number. For example, 13 shows the initial position of the wing, and 13C shows the corresponding cross section of the wing.

The spoiler 12 is in a first stable state 20 with a first shape in the initial position 13 of the wing as shown in FIG. 4A.

FIG. 4B shows the wing deflected upwardly by a small degree from the initial position. As the wing 2 bends and deforms, the compressive stress on the upper skin 8 of the wing increases and consequently the strain in the wing increases. The spoiler is arranged on the wing, so the strain in the wing 2 is at least partially transferred to spoiler 12. The spoiler 12 will therefore also be strained and will deflect to a small degree elastically as compared with the first shape of the spoiler in the initial position 13. If the strains in the upper surface of the wing/wing tip device are sufficiently small the spoiler will remain in the first stable state 20, i.e. the spoiler shape will elastically recover to the initial shape if the wing loading is reduced from the deflected position 14 back to the initial position 13.

FIG. 4C shows the wing deflected upwardly by a larger degree. When the strain in the wing 2 reaches an activation threshold, T, the spoiler 12 rapidly transitions from the first stable state 20 to a second stable state 22, which is best shown in FIGS. 4C, 5C and FIG. 11 or 12.

In the second stable state 22, the spoiler 12 changes to a second shape. In the second shape, the proximal end 12a of the spoiler remains substantially flush to the wing surface. The distal end 12b extends upward from the wing surface. The upper surface 12c of the spoiler curls upward. The final shape of the spoiler 12 is generally curved in shape. The spoiler is bent up and away from the wing aerodynamic surface. This allows the spoiler to disrupt the oncoming airflow, A. The upper surface 12c of the spoiler faces towards the oncoming airflow A. This alters the flow of air over the wing by spoiling the lift and decreases the lift of the local aerofoil section and hence reduces the lift in the outboard wing region of the aircraft. The decreased lift generated by the wing may allow the deflection of the wing 2 to reduce.

The wing strain activation threshold, T, may be set below that strain at the maximum wing deflection position 16 shown in FIG. 4D. The strain in the wing during maximal deflection at position 16 is greater than the strain in the wing during positions 13-15. Even when the wing strain is above the activation threshold, T, the wing loading may still increase up to the maximum wing deflection. When the spoiler is deployed to the second state, the second shape 22 of the spoiler may still deform further if the wing deflection increases up to the maximum wing deflection. Since the second state is a second stable state in the bi-stable system, the spoiler shape will tend to elastically deform and recover when in the second state.

If the wing deflection is further reduced back towards the initial position, as shown in FIGS. 4E-4F through wing deflection positions 17 and 18, the spoiler 12 will remain deployed in the active second state 22. This remains the case even if the strain reduces below the wing strain activation threshold, T, as shown in position 18, because the second state is a stable state.

The wing position 19 shown in FIG. 4G is similar to the initial position 13 of the wing and the spoiler is shown back in the first state. The spoiler 12 may remain in the second, stable, state even when the wing deflection in position 19 is reduced back to the initial position. In some circumstances this may be acceptable and a manual forced 'reset' of the flow control device may be required, e.g. when the aircraft is back on the ground after flight. Alternatively, the airflow over the wing may cause a transition back to the first state.

The spoiler 12 rapidly transitions from the first stable state 20 to the second stable state 22. Here, rapid transition refers to the 'snap through' change from the first stable state to the second stable or steady state in a short period of time. It is a near step change between the first and second shapes of the flow control device through an intermediate unstable equilibrium state.

Figure 8:
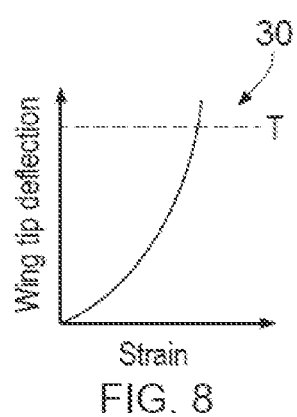
FIG. 8 shows a schematic graph relating aircraft wing tip deflection to (compressive) strain of the aircraft wing upper surface.

FIG. 8 shows a schematic graph 30 which illustrates the relationship between the wing tip deflection and strain in the wing 2. As the wing tip deflection increases, the strain in the wing increases. The broken line shows the strain activation threshold 'T' of the spoiler, 12. Once the strain in the wing exceeds the threshold T, the spoiler will rapidly transition from the first state 20 to the second state 22.

Figure 9:
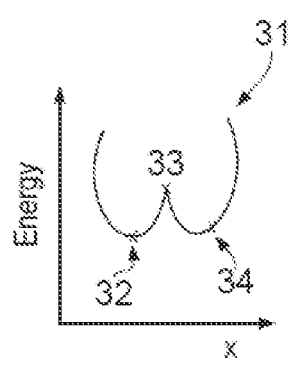
FIG. 9 shows a potential energy graph for a bi-stable system.

In the example described above with respect to FIG. 4A-4G, the spoiler is configured as a bi-stable system. The spoiler can exist in two stable equilibrium states, the first stable state 20 and the second stable state 22. FIG. 9 shows schematically the energy potential of a typical bi-stable system. When the strain transferred to the spoiler 12 is below the activation threshold, T, the spoiler remains in the first stable state 20 as the energy potential remains at the first well region 32. As the strain transferred to the spoiler approaches threshold T, the potential/activation energy approaches the unstable equilibrium at 33. At the unstable equilibrium region 33, if the strain threshold is exceeded, the bi-stable acting spoiler will rapidly transition into the second equilibrium state. The second equilibrium state is the second stable state 22 of the spoiler, and the energy potential in this state is a second well region 34. Even if the strain in the wing 2 then decreases to below the activation threshold value T, the spoiler will initially remain in the second stable state 22 absent further forces acting upon it.

The strain activation threshold T can be tuned to a specific value. The unstable equilibrium region 33 can be determined by altering the geometrical shape, size, thickness, material, material layup, pre-stress etc. of the spoiler 12 to match with the expected strains in the wing 2 to which it is to be mounted.

FIGS. 6A-6G show front views of an aircraft wing with a spoiler 12 in a second example. This example relates to a spoiler arranged to form a mono-stable system. Similarly to FIGS. 4A to 4G, FIGS. 6A to 6G show the aircraft wing at various degrees of upward deflection, e.g. in response to increasing lift generated by the wing. FIG. 6A shows the wing 2 and wing tip device 7 at an initial position 43, and FIGS. 6B though 6D show the wing moving progressively through positions 44 and 45 to a position of maximum upward deflection 46 accompanied by a corresponding reduction of (or even negative) cant angle of the upwardly projecting portion of the wing tip device 7. FIGS. 6E-6G show the wing returning back through positions 47 and 48 to the initial position 49, as the wing deflection reduces, e.g. due to reduced wing loading.

FIGS. 7A to 7G show the corresponding cross-section (through X-X of FIG. 6A) of the wing at each deflection position 43-49 shown in FIGS. 6A-6G. Each corresponding cross section has the same reference numeral, but has a 'C' after the deflection position number. For example, 43 shows the initial position of the wing, and 43C shows the corresponding cross section of the wing.

The spoiler 12 has substantially the same shape in the first and second states as in the previously described first example of FIGS. 4 and 5 (A-G), and so only the differences between the mono-stable and bi-stable arrangement of the spoiler will now be described. The 'snap through' rapid transition of the spoiler from the first state to the second state when the strain activation threshold 'T' is reached is the same as for the bi-stable system of the first example described above. However, in the mono-stable system of the second example, the second state 24 of the spoiler 12 is not a steady equilibrium state, but a quasi-stable or steady state that is not maintained when the strain reduces to below the strain activation threshold 'T'.

Figure 10:
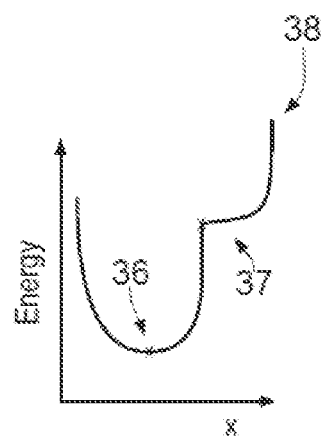
FIG. 10 shows a potential energy graph for a mono-stable system.

FIG. 10 shows schematically the energy potential of a typical mono-stable system. When the strain transferred to the spoiler 12 is below the activation threshold, T, the spoiler remains in the first stable state 20 as the energy potential remains at the first well region 36. As the strain transferred to the spoiler approaches threshold T, the potential/activation energy approaches the unstable equilibrium region 37. At the unstable equilibrium region 37, if the strain threshold is exceeded, the mono-stable acting spoiler will rapidly transition into the second equilibrium region 38. The unstable equilibrium region 7 is a sharp inflection of the energy/strain graph, but always maintaining a positive or near zero gradient.

The second equilibrium region 38 corresponds to the second, steady (or quasi-stable) state 24 of the spoiler. In this second state the spoiler 12 has a distinctly different second shape as compared with the first shape following the snap through of the elastic instability at the unstable equilibrium region 37. The spoiler 12 will revert back to the first stable state 20 (first shape) if the wing strain decreases below the threshold value, T. There may be some hysteresis but this may be small. As shown in FIG. 10, the second equilibrium region 38 always has a positive gradient, there is no second well region unlike in the bi-stable system described previously. If the wing strain remains above the threshold value T, the spoiler will remain in second steady state 24. Once the wing strain decreases to below the threshold value T, the spoiler 12 will quickly transition, or snap through, to return to the first stable state 20. The mono-stable spoiler system is inherently a passive system, as there is only a single stable state. The passive nature of the mono-stable spoiler system requires fewer parts, and no active/passive control, as compared with the bi-stable spoiler system of the first example.

The spoiler 12 described in FIGS. 6A-6G returns to the first stable state after the strain in the wing 2 goes below the activation threshold, T. As shown in FIGS. 7A-7C, which show the corresponding cross sections of the wing, when the compressive strain in the wing decreases below the activation threshold, the spoiler 12 returns back to the first stable state 20, as shown in FIG. 6F.

Multiple spoilers or other flow control devices may be arranged on the wing tip device 7. Each spoiler is actuated independently by the wing strain local to the respective spoiler. The multiple spoilers may be tuned to deflect to the second state at the same wing strain activation threshold, or the spoilers may be tuned to deflect to the second state at different wing strains.

Figure 11:
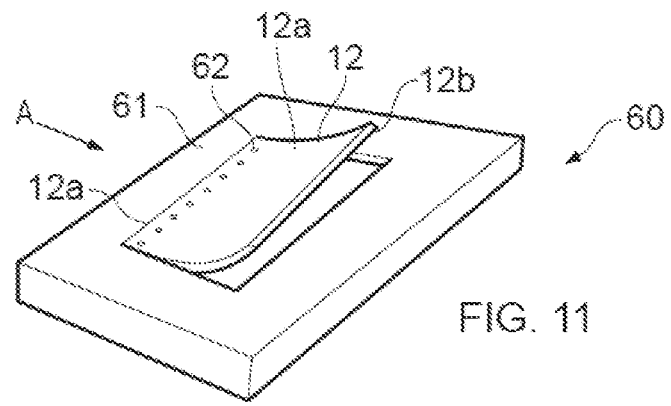
FIG. 11 shows an example of a flow control device attached to a structure.

FIG. 11 shows one way a spoiler 12, according to the previous examples may be attached to the wing 2, 3 or wing tip device 7. It will be understood that this method may also be used for any other spoiler design. The assembly 60, is an aerodynamic structure with an aerodynamic surface 61. The proximal end 12*a* of the spoiler is attached to the aerodynamic structure. The proximal end 12*a* may be attached by mechanical means, for example, by a plurality bolts, 62. It may also be attached by any other mechanical means, such as but not limited to rivets or fasteners.

Figure 12:
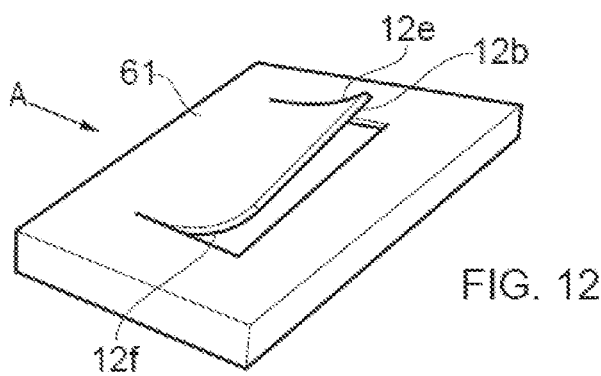
FIG. 12 shows an example of a flow control device integrally formed with a structure.

FIG. 12 shows another method of arranging the spoiler to the aerodynamic structure. The distal end 12*b* and corresponding edges, 12*e* and 12*f* of the spoiler are separated from the aerodynamic surface 61 during the manufacturing process, whilst the proximal end remains integrally formed with the structure. This allows the distal end 12*b* and corresponding edges of the spoiler to remain free to bend up and away as the spoiler changes state from the first state to the second state. In both FIGS. 12 and 13, the aerodynamic surface 61 may have a recess or aperture which receives the spoiler 12 in the rest state. When the spoiler is in the rest state, the upper surface 12*c* of the spoiler may be flush with the aerodynamic surface 61.

The spoiler may comprise composite material, such as fibre reinforced matrix composite, e.g. carbon fibre reinforced plastic (CFRP). To achieve the multi-stable and mono-stable properties of the spoiler, a plurality of laminate layers of composite material with varying fibre direction may be provided in the lay-up.

The multi-stable and mono-stable properties of the spoiler may be created by the use of anisotropic material. The spoiler may be a laminate component, which is made by laying up of a plurality of composite layers. The composite layers may have different orientation of the fibres in order to achieve the anisotropic behaviour properties of the spoiler in order to make it mono-stable or multi-stable.

Figure 13A:
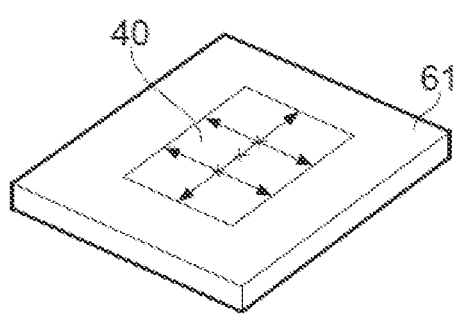
FIG. 13A shows an example of a flow control device comprising isotropic material.
Figure 13B:
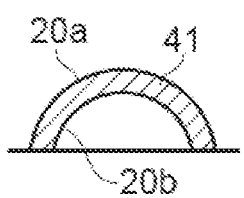
FIGS. 13B-13D show an exemplary method of pre-stressing the flow control device of FIG. 13A on a structure.
Figure 13C:
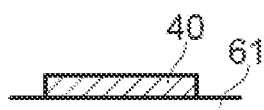
Figure 13D:
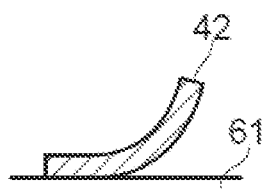

The spoiler may also be made of isotropic material. FIG. 13A shows a spoiler 12 comprising isotropic material, 40, such as, but not limited to metal. In order for an isotropic material to be mono-stable or multi-stable, it may need to be pre-stressed. FIGS. 13B-13D show an example of a flow control device being pre-stressed and installed on a structure.

The flow control device has an upper surface 20*a* and a lower surface 20*b*. Due to the pre-stressing 41 there is created a natural tendency for the flow control device 12 to curl upward in one of its states. The flow control device may then be fixed to the aerodynamic surface, when the aerodynamic structure is deformed in a direction opposite its typical deforming direction, e.g. bending an aircraft wing downwardly. By releasing the load on the deformed aerodynamic structure, the aerodynamic structure relaxes (wing deflects back up) and loads the flow control device to react against the pre-stressing, as shown in FIG. 13C, to create the first stable state of the flow control device. However, when the structure is loaded in its typical direction of deformation, e.g. wing bending upwardly, the flow control device snaps through to a second state (shape) curled upwardly 42 as shown in FIG. 13D. Pre-stressing an isotropic material may be achieved through a variety of known methods, e.g. shot peening one surface of the flow control device.

The mono-stable and multi-stable spoiler design can provide a passive loads alleviation function for an aircraft wing. The passive design reduces or may eliminate the active mechanical components, e.g. hydraulic actuators, required to traditionally actuate flow control devices. This reduces the overall weight of the aircraft and complexity of the aircraft design. Passively actuated spoilers can be used in thin aerofoil sections, such as wing tip devices, where space constraints may prohibit use of traditional actuator components. These thin aerofoil sections are typically found at the wing tips where flow control can have a large lever arm effect on the wing loading. Reduced wing bending moments at the wing root can achieve lighter construction and considerable weight savings for the overall wing design.

The aircraft wing upper aerodynamic surface spoiler examples described in detail above are designed to provide loads alleviation on an extreme wing 'up-bending' case but similar spoilers may be attached to the lower aerodynamic surface of the wing to provide loads alleviation on an extreme wing 'down-bending' case that might occur during some aileron-driven manoeuvres. In that case, the lower aerodynamic surface of the wing will exhibit compressive strain, and selecting an activation threshold of that lower surface strain can be used as the trigger for deployment of the lower surface spoiler from a first, flush shape or state to the second 'deployed' state or shape. The wing may have both these upper and lower surface spoilers.

Although this invention has been described in relation to a spoiler on an aircraft aerodynamic structure, it will be understood that this invention may be utilised for a number of different flow control devices on different aerodynamic structures which experience strain.

FIGS. 14A-23 show various examples of flow control devices 112, 212, 312, 412, 512, 612 arranged as spoilers on the aircraft wing. Different arrangements will be discussed in greater detail below.

The spoilers 112, 212, 312, 412, 512, 612, 615, 617 operate in a similar manner to spoiler 12 shown in FIGS. 1-13, as they rapidly transition from a first stable state 120, 220, 320, 420, 520, 620 to a second state 122, 222, 322, 422, 522, 622. Each spoiler transitions into the second state when the strain in the wing reaches the activation threshold. The strain in the wing, acting on the spoilers 112, 212, 312, 412, 512, 612, 615, 617, is in a direction transverse to an oncoming airflow direction, A.

Each spoiler may be a mono-stable or bi-stable spoiler. In a bi-stable arrangement, the spoiler 112, 212, 312, 412, 512, 612, 615, 617 may snap-through into a second state 122, 222, 322, 422, 522, 622 once the span-wise strain in the wing 2 or wing tip device 7 exceeds the strain activation threshold T, and remain in the second state after the strain has decreased below the threshold T unless an external force acts upon it. In a mono-stable arrangement, the spoiler 112, 212, 312, 412, 512, 612, 615, 617 returns to the first state 120, 220, 320, 420, 520, 620 after the strain in the wing 2 or wing tip device 7 decreases below the strain activation threshold T.

Figure 14A:
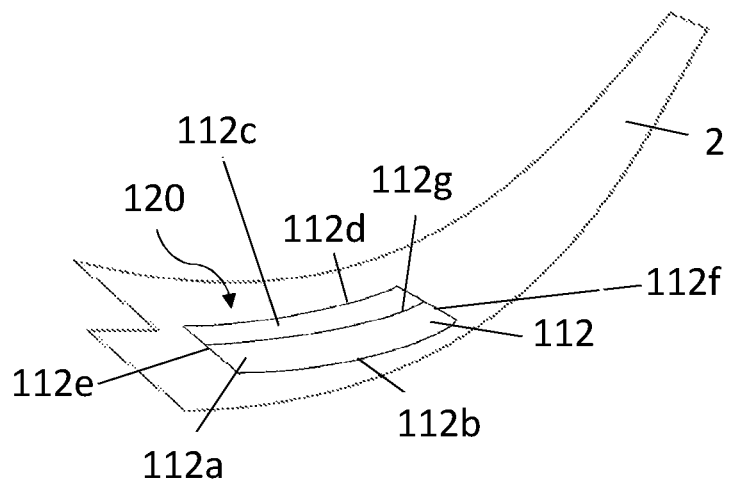
FIGS. 14A-14C show an example of a flow control device arranged on a portion of an aircraft wing.

FIG. 14A shows a lift spoiler 112 on a wing 2 in the first state 120. The lift spoiler 112 has a first portion 112a with a proximal end 112b and a second portion 112c with a distal end 112d. The lift spoiler has an upper surface 112h and an opposing lower surface 112i. The first portion 112a and second portion 112c are connected along line 112g. In the first state 120, the spoiler 112 is generally rectangular in planform, with a first short side 112e and a second short side 112f which each belong to both the first portion 112a and the second portion 112c.

The first short side 112e and second short side 112f are generally parallel to an oncoming flow direction A. As shown in FIG. 14A, the proximal end 112b has a generally straight leading edge that is transverse to the oncoming airflow direction A. The straight leading edge 112b allows the spoiler 112 to be easily manufactured and attached to a wing 2 or wing tip device 7.

The spoiler 112 may be attached to a wing 2 or wing tip device 7 at the proximal end 112b by any suitable means, for example by mechanical means, such as bolting. Alternatively, the spoiler 112 may be integrally formed with the aircraft wing surface.

Figure 14B:
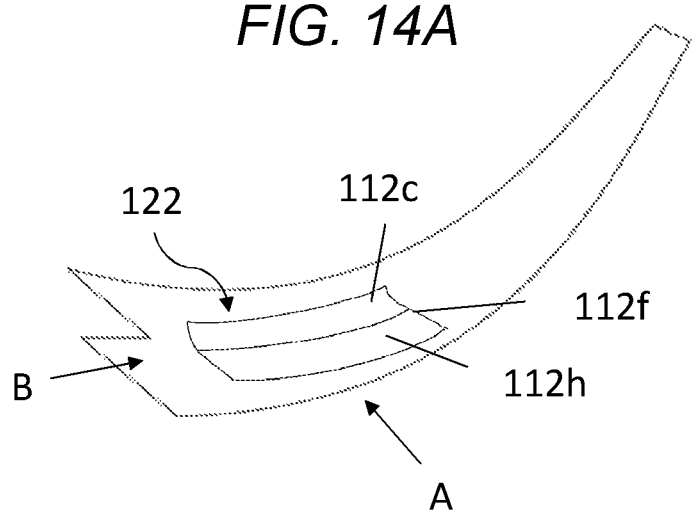
Figure 14C:
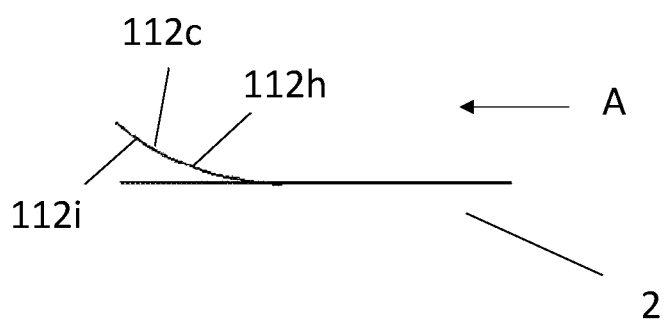

The spoiler 112 has a distal end 112d opposite the proximal end 112b. The distal end 112d is unattached to the aircraft wing surface. As shown in FIGS. 14B and 14C in the second state 122, the first portion 112a of the spoiler 112 remains substantially flush to the surface of the wing 2 or wing tip device 7, while the second portion 112c and the distal end 112d is bent away from the surface. The spoiler 112 is therefore cantilevered from the wing 2 or wing tip device 7 by the proximal end 112b. The strain in the wing 2 or wing tip device 7 is at least partially transferred to the spoiler 112 through the proximal end 112b of the spoiler.

FIG. 14C is a side view of the spoiler 112 on the wing 2 from direction B. As shown in FIG. 14C, the upper surface 112h of the second portion 112c of spoiler faces towards the oncoming airflow direction A. This allows the spoiler 112 to disrupt the oncoming airflow A by altering the flow of air over a wing 2 or wing tip device 7 by spoiling the lift while the first portion 112a of the spoiler lies flush against the wing 2/wing tip device 7.

Figure 15A:
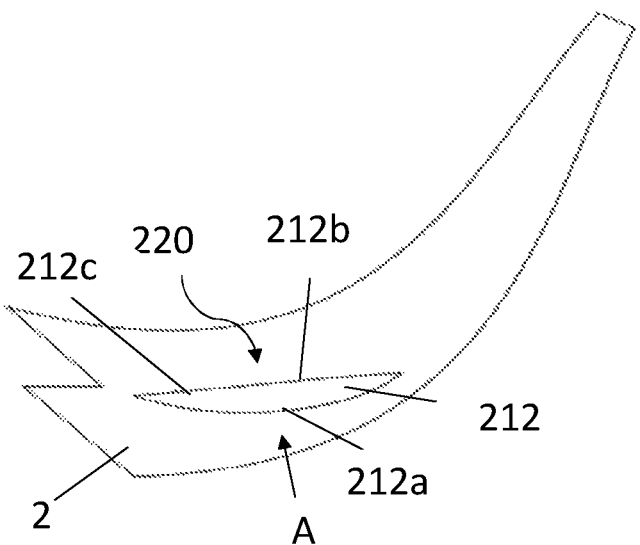
FIGS. 15A-15E show a further example of a flow control device arranged on a portion of an aircraft wing.
Figure 15B:
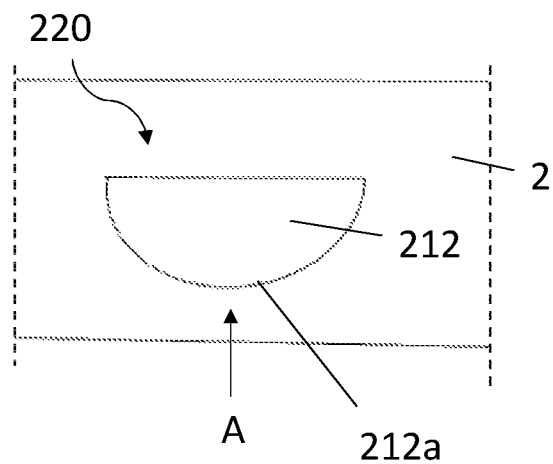

FIGS. 15A and 15B show another example of a lift spoiler 212 arranged on a wing 2 in a first state 220. The lift spoiler 212 has a proximal end 212a and an opposing distal end 212b. The lift spoiler has an upper surface 212c and an opposing lower surface (not shown). In the first state 220, the spoiler 212 is generally semi-circular in planform.

FIG. 15B shows a plan view of the spoiler 212 on a section of a wing 2 in the first state 220. The proximal end 212a is generally curved and facing the oncoming flow direction A, with a forward-most portion being normal to the oncoming flow direction A. The distal end 212b is generally straight and is opposite the proximal end 212a. The spoiler 212 may be attached to the wing 2 at the distal end 212b by any suitable means, for example by mechanical means, such as bolting. Alternatively, the spoiler 212 may be integrally formed with the aircraft wing surface. The strain in the wing 2 is at least partially transferred to the spoiler 212 through the proximal end 212a of the spoiler 212.

As shown in FIG. 15A, in the first state 220 the upper surface 212c of the spoiler 212 has a shape that corresponds to or conforms to the local surrounding aerodynamic surface of the wing 2. The spoiler 212 is substantially flush with the aerodynamic surface of the wing 2 when in the first state 220.

Figure 15C:
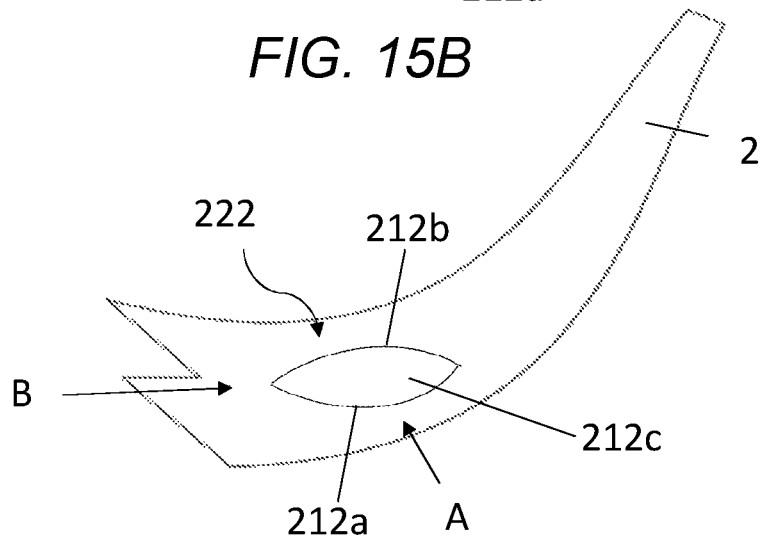
Figure 15D:
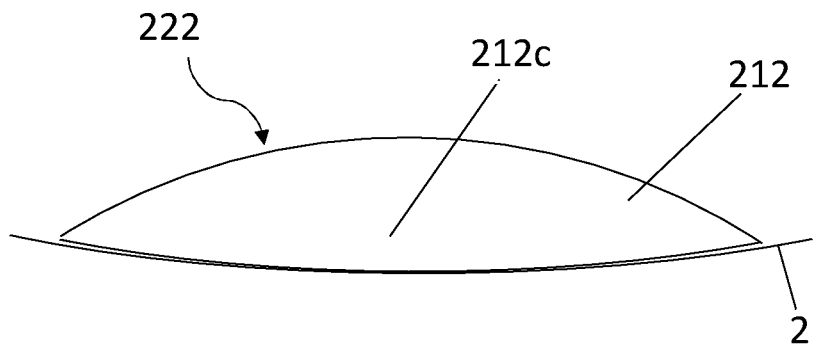
Figure 15E:
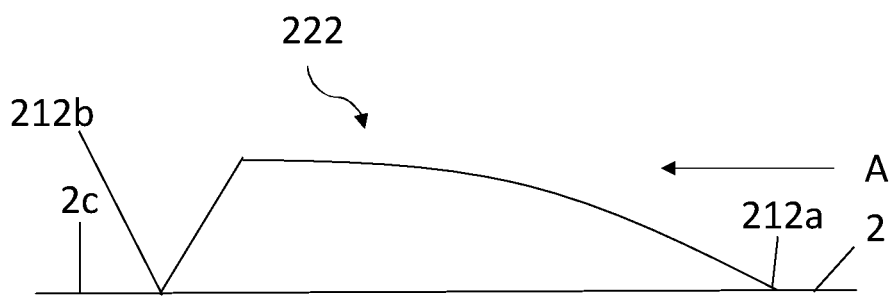

FIGS. 15C-15E show the spoiler 212 in the second state 222. FIG. 15C shows a front view of the spoiler 212, in particular showing the profile of the spoiler 212 presented to the oncoming airflow. FIG. 15E is a side view of the spoiler 212 from direction B shown in FIG. 15C. The proximal end 212a is attached to the aircraft wing surface 2c, whilst the distal end 212b is unattached. The spoiler 212 is therefore cantilevered from the structure about the proximal end 212a.

The generally curved proximal end 212a, in this case the leading edge facing the oncoming flow direction A, reduces the activation threshold of the spoiler 212 with respect to the rectangular spoiler 112 of FIGS. 14A-14C. The generally curved proximal end 212a may also alter the air flow characteristics across the spoiler 212.

Figure 16A:
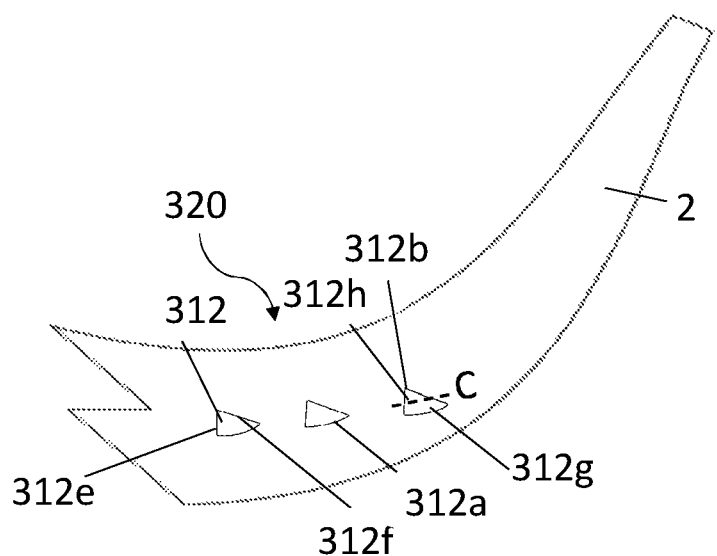
FIGS. 16A-16H show a further example of a flow control device arranged on a portion of an aircraft wing.

FIG. 16A shows an example of three spoilers 312 arranged on a wing 2 in a first state 320. The spoilers 312 may be substantially identical. Each lift spoiler 312 has a proximal end 312a, which forms a leading edge, and an opposite distal apex 312b. In the first state 320, the spoiler 312 is generally triangular in planform. The proximal end 312a of the spoiler 312 has a generally straight leading edge that is transverse to the oncoming airflow direction A. The straight leading edge 112b allows the spoiler 112 to be easily manufactured and attached to a wing 2 or wing tip device 7.

Each spoiler 312 may be attached to the wing 2 or wing tip device 7 at the proximal end 312a by any suitable means, for example by mechanical means, such as bolting. Alternatively, each spoiler 312 may be integrally formed with the aircraft wing surface. The strain in the wing 2 may be at least partially transferred to the spoilers 312 through the proximal end 312a of the spoilers.

Figure 16B:
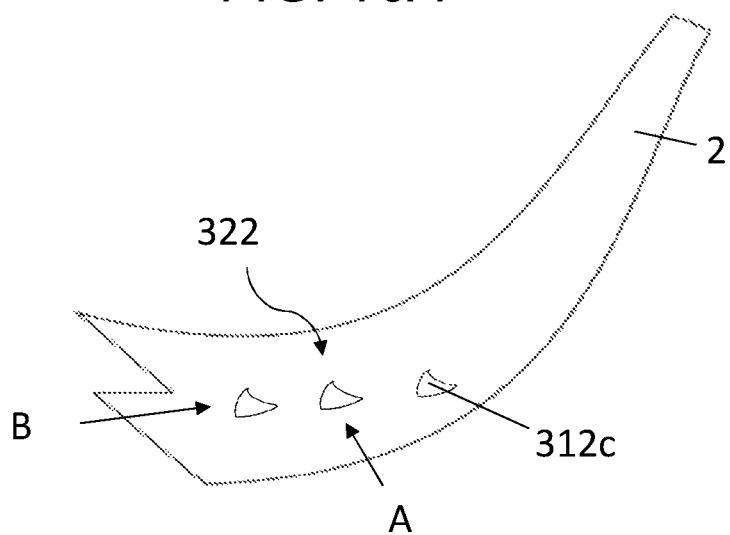
Figure 16C:
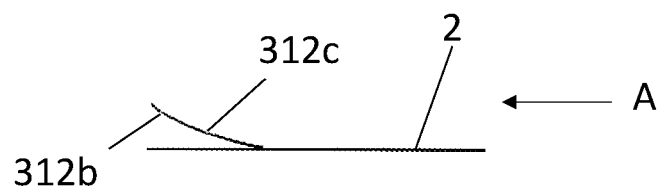

Each spoiler 312 has a first edge 312e and a second edge 312f that meet at the distal apex 312b. The distal apex 312b is opposite to the proximal end 312a. As shown by FIGS. 16B and 16C in the second state 322, the first portion of each spoiler 312g is arranged to remain substantially flush to the surface of the wing 2 or wing tip device 7, while the second portion 312h, including the distal apex 312b, is unattached to the aircraft wing surface 2c. Each spoiler 312 transitions to the second state when strain in the wing 2 partially transfers through to the proximal leading edge 312a, as the proximal leading edge 312a is attached to the wing 2.

As shown in FIGS. 16B and 16C in the second state 322, the second portion 312h of the spoiler 312 is bent away from the surface of the wing 2. The spoiler 312 is therefore cantilevered from the wing 2 by the proximal end 312a. FIG. 16C is a side view of the spoiler 312 on wing 2 from direction B. As shown in FIG. 16C, the upper surface 312c of the spoiler 312 faces towards the oncoming flow direction A. This allows the spoiler 312 to disrupt the oncoming airflow A by altering the flow of air over the wing 2.

The arrangement of spoilers 312 shown in FIG. 16A is only exemplary. It will be understood that there may be any number of spoiler 312 arranged on the wing 2, for example, one, two or more. The spoilers 312 may also be arranged in any suitable configurations and orientations.

While the spoiler 312 is shown to be generally triangular, the spoiler 312 may be any other suitable shape.

Figure 16D:
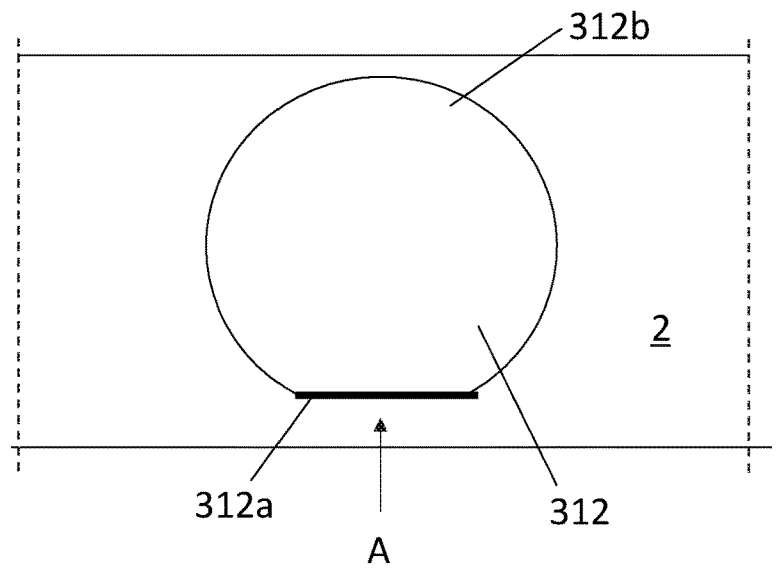

FIG. 16D shows the spoiler 312 as generally scallop-shaped, with a proximal end 312a generally facing oncoming airflow direction A and an opposite distal end 312b.

Figure 16E:
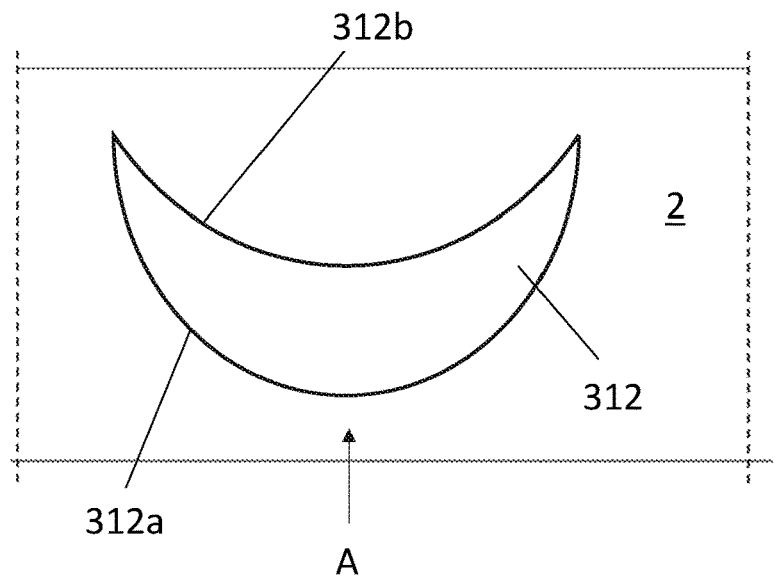

The spoiler 312 may have opposing proximal and distal ends 312a, 312b that are each generally curved. FIG. 16E shows an alternative configuration of the spoiler 312 that is generally crescent-shaped, with a proximal end 312a generally facing oncoming airflow direction A and an opposite distal end 312b.

Figure 16F:
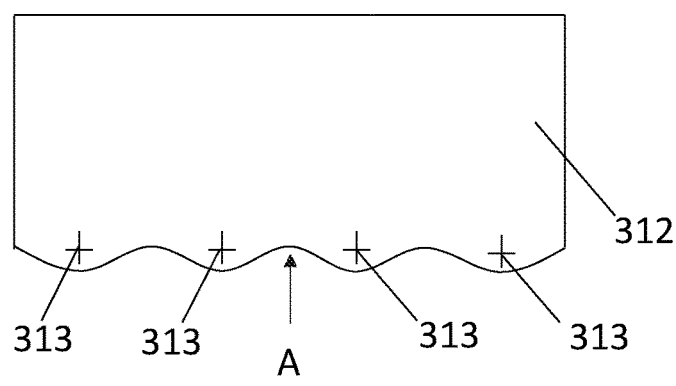

FIG. 16F shows an alternative configuration of the spoiler 312 in which the proximal end 312a is non-linear. The spoiler 312 shown in FIG. 16F is attached to the wing 2 at discrete locations 313, for example by riveting or bolting the spoiler 312 to the wing 2.

Figure 16G:
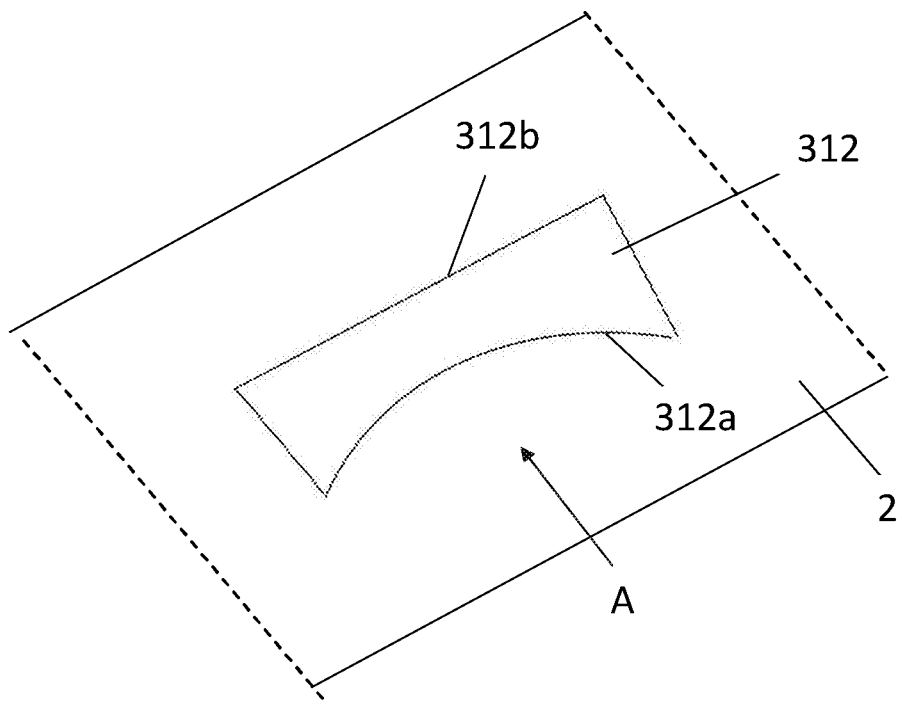

FIG. 16G shows an alternative configuration of the spoiler 312 that is generally rectangular-shaped, with a curved proximal end 312a facing oncoming the airflow direction A and an opposite distal end 312b. In this example the distal end 312b is substantially straight.

Figure 16H:
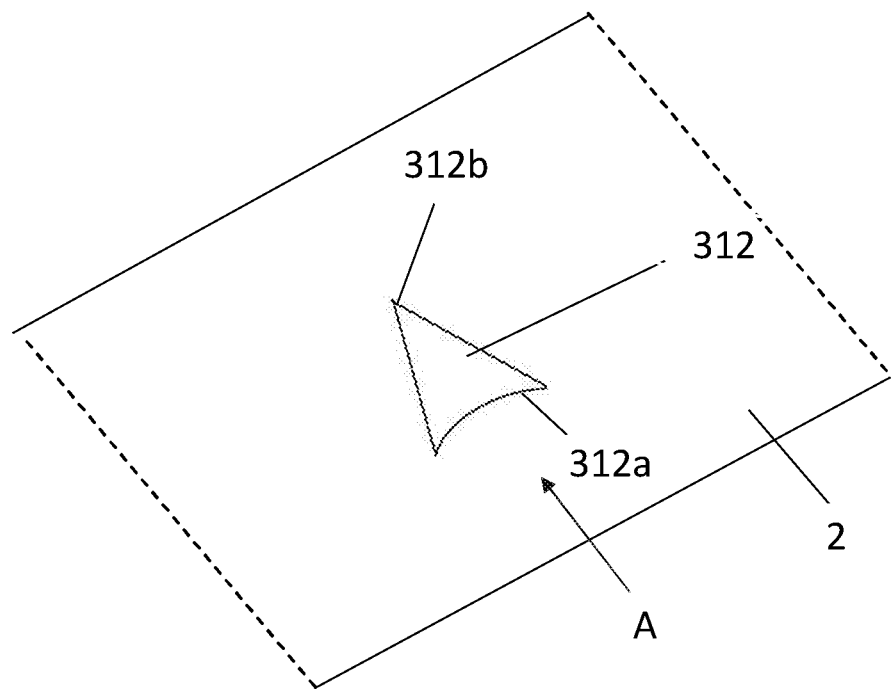

FIG. 16H shows a spoiler 312 that is generally triangular shaped, similar to that shown in FIG. 16A. The spoiler has a curved proximal end 312a facing oncoming airflow direction A and an opposite distal end 312b.

The curved proximal end 312a of FIGS. 16G and 16H allows the spoiler 312 to transition into the second state 322 at a lower activation threshold, as less strain is required to move the spoiler 312 to the second state 322.

While the above examples have been described with a proximal end 312a facing an oncoming airflow direction A, it will be understood that the spoilers may be arranged in opposite configurations, e.g. the distal apex 312b of lift spoiler 312 in FIG. 16A may be nearer the oncoming airflow direction A.

Figure 17A:
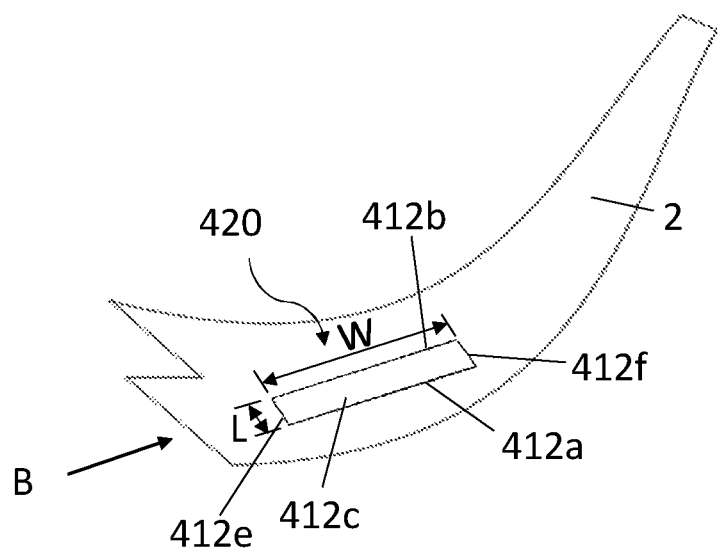
FIGS. 17A-17F show a further example of a flow control device arranged on a portion of an aircraft wing.

FIG. 17A shows another example of a lift spoiler 412 arranged on a wing 2 in the first state 420. The lift spoiler 412 has a proximal end 412a and an opposing distal end 412b. The spoiler 412 has an upper surface 412c and an opposing lower surface 412d (See FIG. 17F). As shown in FIG. 17A, the lift spoiler 412 is generally rectangular in planform, with a first short side 412e and a second short side 412f. The spoiler 412 has a width W that extends chordwise, and a length L that extends spanwise. Preferably, the width W of the spoiler is greater than the length L. The length L to width W ratio may be greater than 3:1 or 4:1.

The first short side 412e and second short side 412f preferably extend generally parallel to the oncoming airflow direction A. As shown in FIG. 17A the proximal end 412a has a generally straight leading edge that is transverse to the oncoming airflow direction A. The straight proximal end 412a allows the spoiler 412 to be easily manufactured and attached to the wing 2.

Figure 17B:
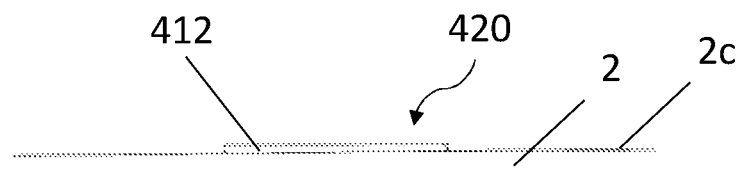
Figure 17C:
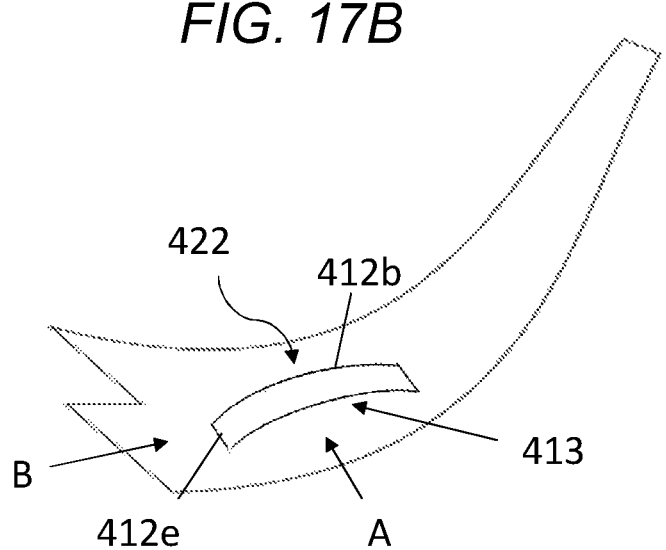

As shown in FIG. 17A, in the first state 420 the upper surface 412c of the spoiler 412 has a shape that corresponds or conforms to the local surrounding aerodynamic surface of the wing 2. FIG. 17B shows a view of the spoiler 412 from direction B in FIG. 17A and shows that the spoiler 412 is substantially flush with the aerodynamic surface of the wing 2 when in the first state 420.

Figure 17D:
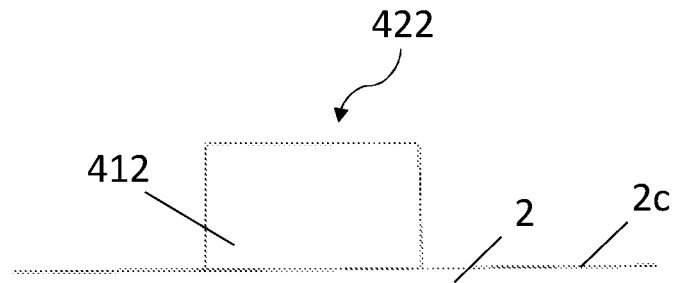
Figure 17E:
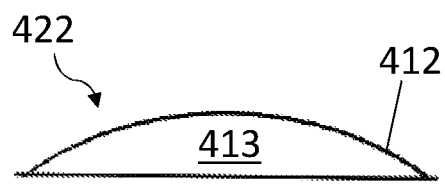
Figure 17F:
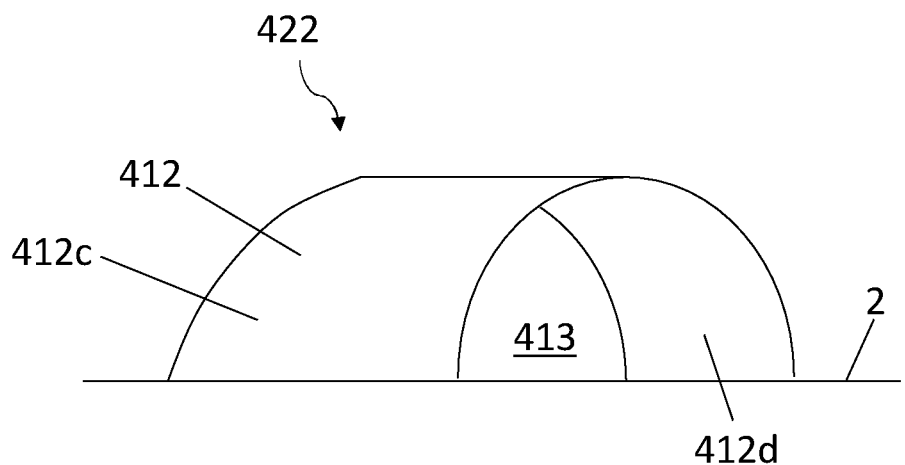

FIG. 17D shows a side view of the spoiler 412 from direction B in the second state 422. In the second state 422, the lift spoiler 412 is configured to be spaced away from the wing 2 so that the oncoming airflow A can flow between the spoiler 412 and the upper surface of the wing 2c, as well as over the upper surface 412c of the spoiler 412. As shown more clearly in FIGS. 17E and 17F, in the second state 422, the upper surface 412c of the spoiler 412 is spaced away from the wing 2 to create a gap 413. The second shape of the spoiler 412 may be an archway, as shown in FIG. 17F. While the archway is shown to be generally round in shape, it will be understood that any suitable shape of archway may be used. For example, the archway may be a flat arch, a triangular arch, or a horseshoe arch. The oncoming airflow A passes through the gap 413, which disrupts the oncoming airflow A.

The spoiler 412 is secured to the wing at attachment points. The attachment points may be the first short side 412e and second short side 412f, as shown in FIG. 17F. Strain from the wing 2 is at least partially transferred to the spoiler 412 through the attachment points. The fewer attachment points used, the less strain is required for the spoiler 412 to transition from the first state 420 to the second state 422. The elongate shape of the spoiler 412 enables the spoiler to transition from the first state 420 to the second state 422 more easily, i.e. less strain is required in the wing to transition the spoiler 412 from the first state 420 to the second state 422. The strain in the structure is in a direction transverse to the oncoming airflow, A.

The spoiler 412 may be attached to the wing 2 at the first short side 412e and the second short side 412f respectively by any suitable, for example by mechanical means, such as bolting. The proximal end 412a and distal end 412b of the spoiler may be unattached to the wing surface 2c, which enables the spoiler 412 to move away from the wing surface 2c to create an archway and form the gap 413.

Figure 18A:
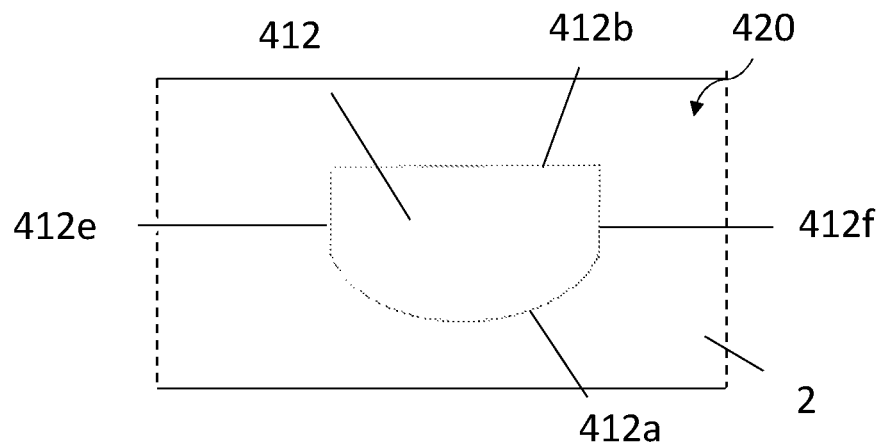
FIGS. 18A-18C show an example of a flow control device arranged on a portion of an aircraft wing.
Figure 18B:
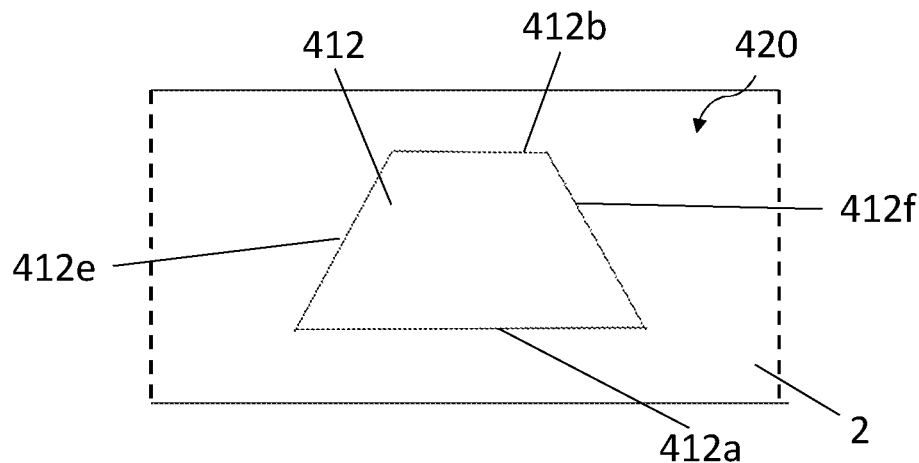
Figure 18C:
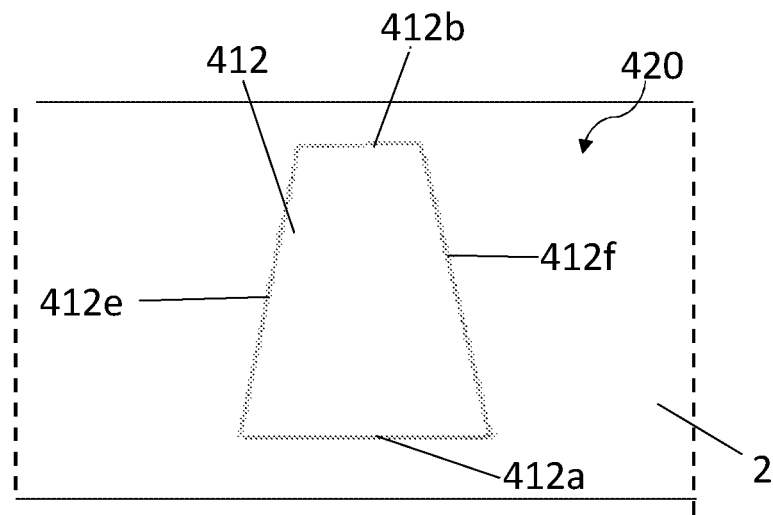

While the lift spoiler 412 is shown as being generally rectangular in planform in FIGS. 17A-17F, this is merely an example and it will be understood that other shapes and configurations may be used. FIGS. 18A-18C show different configurations of the lift spoiler 412. The examples described in 18A-18C operate in substantially the same manner as the lift spoiler 412 described in FIG. 17A-17F.

FIG. 18A shows the spoiler 412 as having a curved proximal end 412*a* facing oncoming airflow direction A and an opposing straight distal end 412*b*. The spoiler 412 acts similarly to the spoiler 12 described earlier, however the curved leading edge 41*a* enables the spoiler 412 to transition to the second state 422 at a lower strain level than an equivalent example having a straight proximal end 412*a*.

FIG. 18B shows an alternative configuration of the spoiler 412 where the spoiler 412 is generally trapezoidal-shaped, with a proximal end 412*a* facing oncoming airflow direction A and an opposing distal end 412*b*. The first short side 412*e* and second short side 412*f* are angled with respect to the proximal end 412*a*. The proximal end 412*a* has a greater length than the opposite distal end 412*b*.

FIG. 18C shows an alternative configuration of the spoiler 412, where the spoiler 412 is generally trapezoidal-shaped, with a proximal end 412*a* facing oncoming airflow direction A and an opposing distal end 412*b*. The first short side 412*e* and second short side 412*f* are angled with respect to the proximal end 412*a*. In this example, the first short side 412*e* and the second short side 412*f* have a greater length than the proximal end 412*a* and the distal end 412*b*, in contrast to the example of FIG. 18B in which the first short side 412*e* and the second short side 412*f* are shown to have a length smaller than the proximal end 412*a*.

Figure 19A:
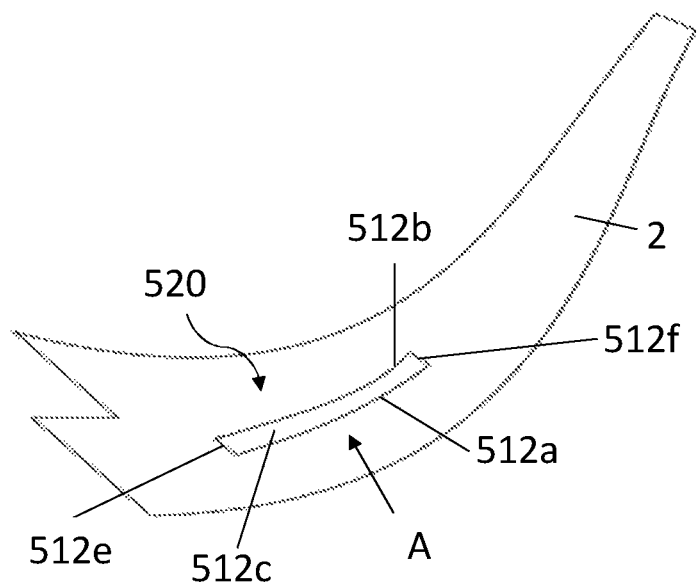
FIGS. 19A-19E show a further example of a flow control device arranged on a portion of an aircraft wing.
Figure 19B:
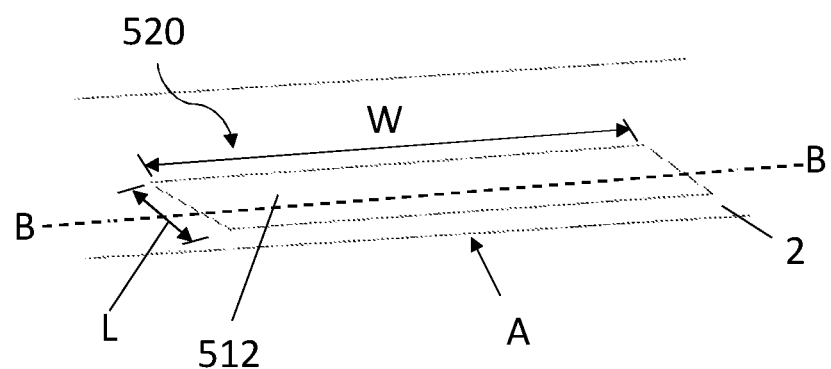

FIG. 19A shows another example of a lift spoiler 512 arranged on a wing 2 in the first state 520. The lift spoiler 512 has a proximal end 512*a* and an opposing distal end 512*b*. The spoiler 512 has an upper surface 512*c* and an opposing lower surface (not shown). As shown in FIG. 19B, the lift spoiler 512 is generally rectangular in planform, with a first short side 512*e* and a second short side 512*f*. The spoiler 512 has a width W that extends chordwise, and a length L that extends spanwise. Preferably, the width W of the spoiler 512 is greater than the length L.

Figure 19C:
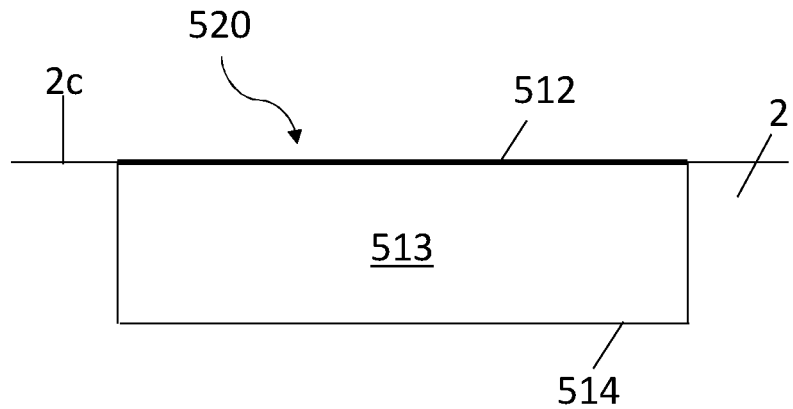

In the first state 520 the upper surface 512*c* of the spoiler 512 has a shape that corresponds or conforms to the local surrounding aerodynamic surface of the wing 2, as shown in FIG. 19B. FIG. 19C shows a chord-wise cross-section of the wing at line B-B of FIG. 19B, and shows that the spoiler 512 is substantially flush with the aerodynamic surface of the wing 2 when in the first state 520.

Figure 19D:
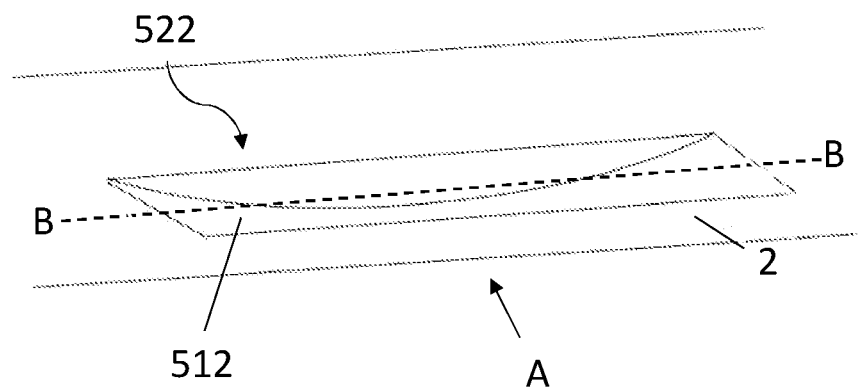
Figure 19E:
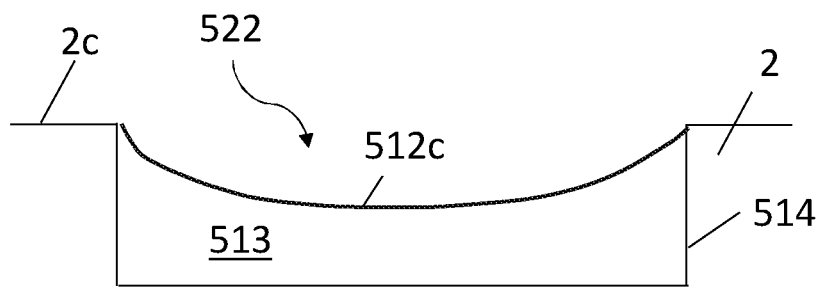

The lift spoiler 512 is configured in the second state 522 to depress below the surrounding aerodynamic structure, as shown in FIGS. 19D and 19E. The lift spoiler 512 defines a recess 513 within the wing 2. FIG. 19E shows a chord-wise cross section of the wing 2 along line B-B in FIG. 19D. In the second state 522, the upper surface 512*c* of the spoiler 512 is spaced away from the surface of the wing 2*c*.

As shown in FIG. 19C, the recess 513 may be formed as channels 514 in the wing 2. The channels 514 may extend generally transverse to the oncoming airflow direction A. This ensures that the oncoming airflow direction A is disrupted as the airflow flows into the channel 514.

The spoiler 512 is secured to the wing at attachment points. The attachment points may be the first short side 512*e* and the second short side 512*f*. Strain from the wing 2 is at least partially transferred to the spoiler 512 through the attachment points. The fewer attachment points used, the less strain is required for the spoiler 512 to transition from the first state 520 to the second state 522. The elongate shape of the spoiler 512 enables the spoiler to transition from the first state 520 to the second state 522 more easily, i.e. less strain is required in the wing to transition the spoiler 512 from the first state 520 to the second state 522. The strain in the structure is in a direction transverse to the oncoming airflow, A.

The spoiler 512 may be attached to the wing 2 by any suitable means, for example by mechanical means, such as bolting. The unattached ends, for example the proximal end 512*a* and distal end 512*b* of the spoiler 512, are able to depress down into the recess 513 of the channel 514.

Figure 20A:
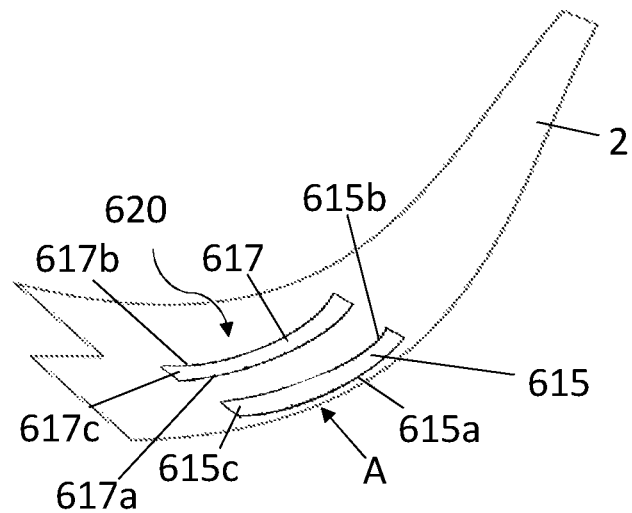
FIGS. 20A-20E show a further example of a flow control device arranged on a portion of the aircraft wing.

Two or more spoilers may operate to form a single flow control device. FIG. 20A shows a first spoiler 615 and a second spoiler 617 arranged on wing 2 in the first state 620. Both spoilers 615 and 617 may be substantially identical to each other and arranged spaced from each other in the direction of the oncoming airflow direction A.

Figure 20B:
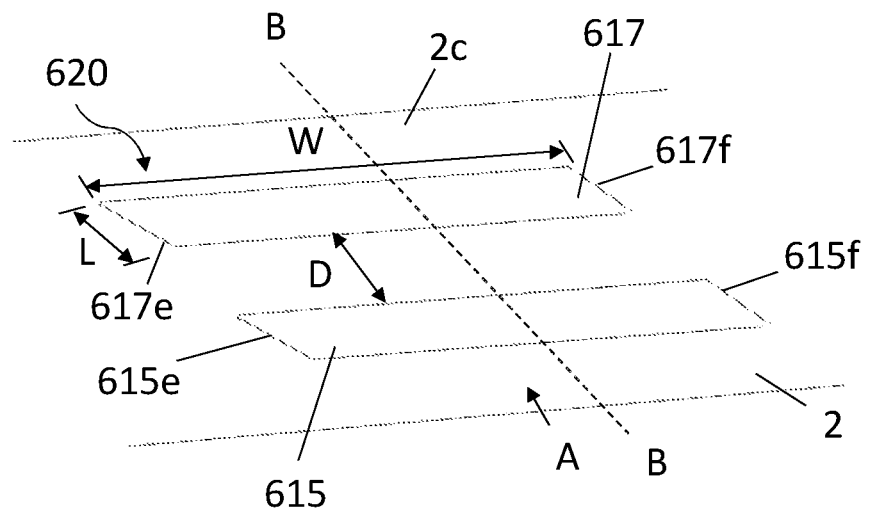

The first spoiler 615 has a proximal end 615*a* and an opposing distal end 615*b*. The first spoiler 615 has an upper surface 615*c* and an opposing lower surface (not shown). As shown in FIG. 20B, the first spoiler 615 is generally rectangular in planform, with a first short side 615*e* and a second short side 615*f*.

The second spoiler 617 also has a proximal end 617*a* and an opposing distal end 617*b*, as well as an upper surface 615*c* and an opposing lower surface (not shown). The second spoiler 615 is generally rectangular in planform, with a first short side 617*e* and a second short side 617*f*, as shown in FIG. 20B.

The first spoiler 615 is spaced a distance D from the lift spoiler 617. The distance D can may be any suitable distance. Each spoiler 615, 617 has a width W and a length L. As shown in FIG. 20B, the width of the spoilers is generally larger than the length L of the spoiler. The length L to width W ratio may be greater than 3:1 or 4:1.

Figure 20C:
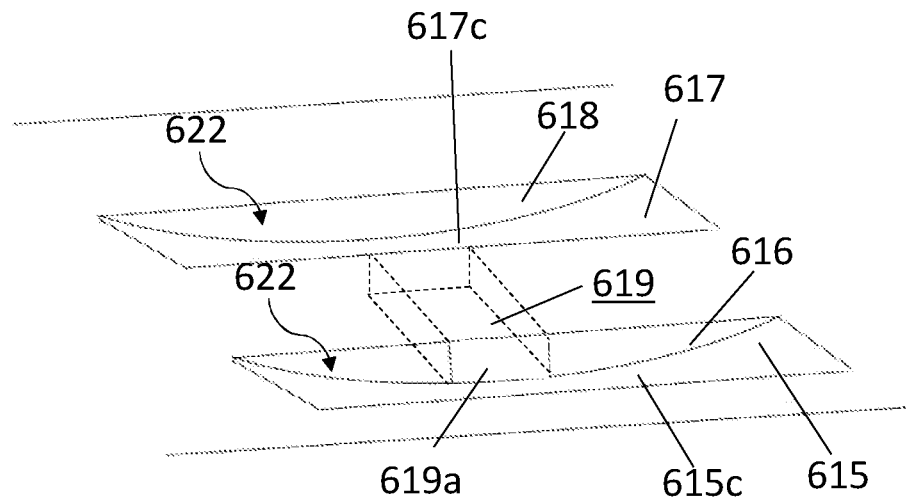

In the second state 622, the lift spoilers 615, 617 are configured to depress below the surrounding aerodynamic structure, as shown in FIG. 20C. Each of the spoilers 615, 617 defines a respective recess 616, 618 in the wing 2. As shown in FIG. 20C, in the second state 622, the upper surfaces 615*c* and 617*c* of the spoilers are spaced from the surface of the wing 2*c* and extend into the respective recesses 616, 618.

As shown in FIG. 20C, the recesses 616, 618 are formed as channels 616, 618 in the wing 2. The channels 616 and 618 extend generally transverse to the oncoming airflow direction A.

As shown in FIG. 20C, the wing 2 has a duct 619 within the aerodynamic surface. The duct 619 extends in a generally chordwise direction below the surface of the wing 2*c*. When the first spoiler 615 is in the second state 622, the first spoiler 615 forms a first opening 619*a* into the channel 616 and into the duct 619. Similarly, when the second spoiler 617 is in the second state 622, the second spoiler 617 forms a second opening 619*b* on an opposite side of the duct 619. This enables the oncoming airflow A to flow into the channels 616, 618, and through the duct 619 to disrupt the oncoming airflow and the subsequent lift of the wing 2.

Figure 20D:
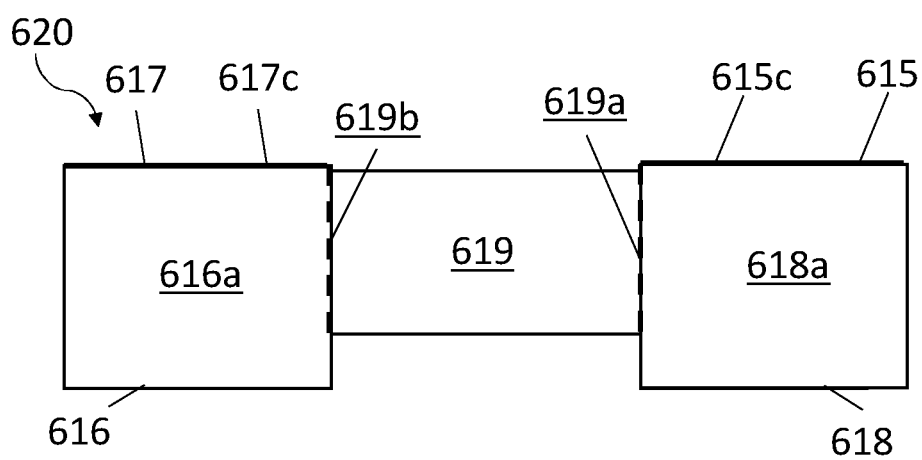
Figure 20E:
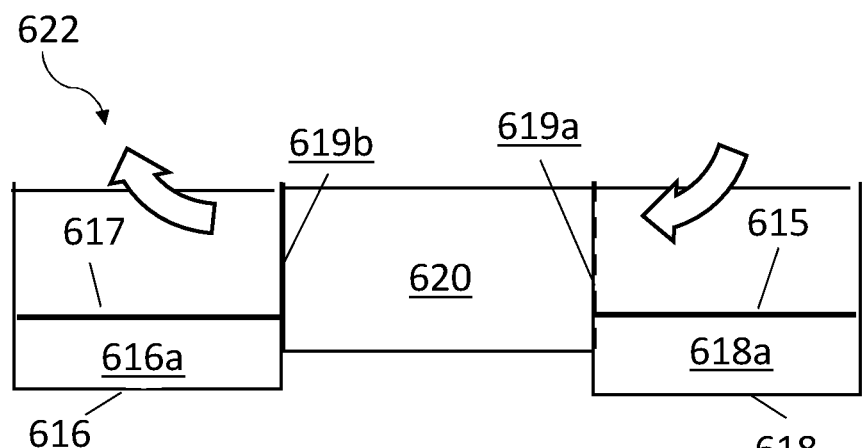

FIGS. 20D and 20E are cross-sectional views of the aerofoil along line B-B in FIG. 20B. As shown in FIG. 20D, in the first state 620, the upper surfaces 615*c*, 617*c* of the spoilers 615, 617 each have a shape that corresponds or conforms to the local surrounding aerodynamic surface of the wing 2. The spoilers 615, 617 are substantially flush with the aerodynamic surface of the wing 2 when in the first state 620. The openings 619*a* and 619*b* to the duct 619 are in communication with channels 616 and 618, but as the spoilers 615 and 617 are in the first state, no airflow passes through the channel 619.

FIG. 20E shows the spoilers 615 and 617 in the second state 622. The upper surfaces 615c, 617c both depress into the respective channels 616, 618, such that the oncoming airflow may enter the duct 619 via the opening 619a. The opening 619a may only be partially opened in the second state 622 of the spoiler 615 (as shown). Alternatively, the entire opening 619a may be opened in the second state 622 to maximise disruption to the airflow.

Strain from the wing 2 is at least partially transferred to the spoilers 615, 617 through the attachment points. The attachment points may be the first short side 615e, 617e and second short side 615f, 617f. The fewer attachment points used, the less strain is required for the spoiler 615, 617 to transition from the first state 620 to the second state 622. The elongate shape of the spoilers 615, 617 enables the spoilers to transition from the first state 620 to the second state 622 more easily, i.e. less strain is required in the wing to transition the spoilers 615, 617 to the second state 622. The strain in the structure is generally in a direction transverse to the oncoming airflow, A.

As shown in FIGS. 20A-20E, the first spoiler 615 and second spoiler 617 may be attached to the wing 2 by any suitable means, for example by mechanical means, such as bolting. The proximal ends 615a, 617a and distal ends 615b, 617b of each spoiler 615, 617 may be unattached to the wing surface, which enables the spoilers 615, 617 to depress down into the respective recesses 616a, 618a of the channels 616, 618. The spoilers 615, 617 may be attached by at least two points to the wing 2, such as the opposite corners. Preferably, the spoilers 615, 617 are attached in the same manner such that both spoilers 615, 617 are deployed simultaneously.

It will be understood that the example shown in FIGS. 20A-20E is not limited to any particular shape of spoiler 615, 617, and that any shapes may be used for each respective spoiler 615, 617, such as those shown in the previous examples.

As the wings 2, 3 are similar in construction, the starboard wing 3 may have a similarly arranged flow control device for symmetry with the port wing 2. However, the spoiler examples described in detail above are only exemplary. Any number of spoiler designs may be used in combination on a wing 2, 3, and at any suitable location, e.g. closer to the trailing edge or the leading edge, or closer to the fuselage or tip of the wing 2,3.

Figure 21A:
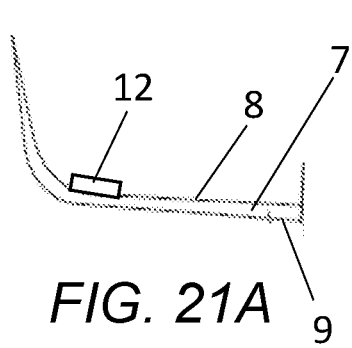
FIGS. 21A-21D show a front view of an aircraft wing with flow control devices arranged at different locations on the wing.
Figure 22A:
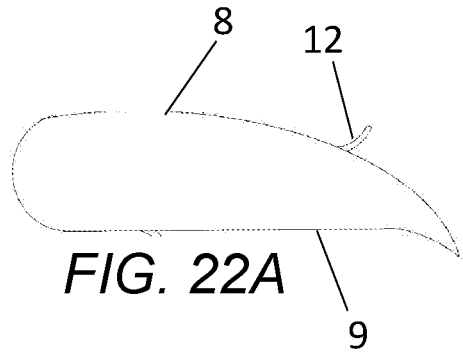
FIGS. 22A-22D show the corresponding cross sections of the aircraft wing shown in FIGS. 21A-21D.
Figure 21B:
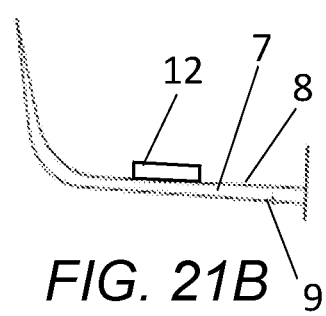
Figure 22B:
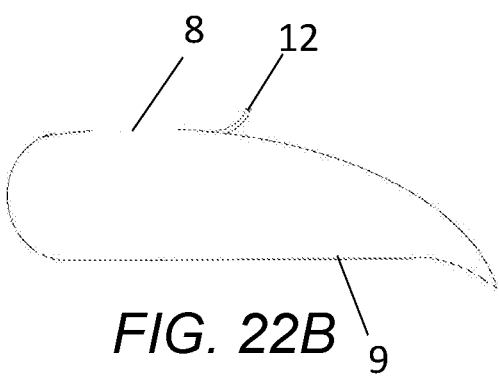
Figure 21C:
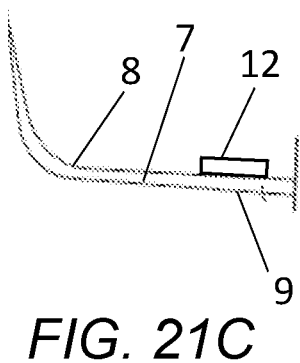
Figure 22C:
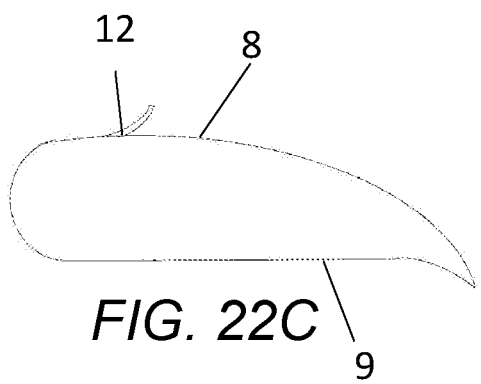
Figure 21D:
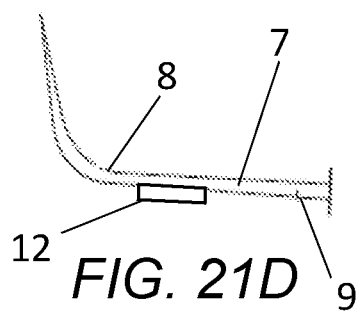
Figure 22D:
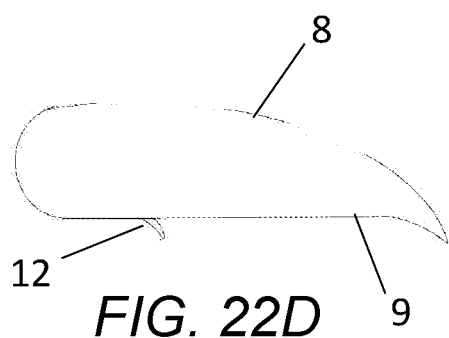

FIGS. 21A and 22A show a spoiler 12 arranged nearer the wing tip of the wing tip device 7 than the wing root of the wing tip device 7. Similarly, the spoiler 12 may be arranged nearer the tip end of the wing 2, 3 than the root end of the wing 2, 3. FIGS. 21B and 22B show the spoiler 12 arranged centrally on the wing tip device 7. Alternatively, the spoiler 12 may be arranged centrally on the wing 2, 3. FIGS. 21C and 22C show the spoiler 12 arranged nearer to the root of the wing tip device 7 than the tip of the wing tip device 7. Similarly, the spoiler 12 may be arranged nearer the root end of the wing 2, 3 than the tip end of the wing 2, 3. In some examples, the spoilers 12 may be arranged on the underside of the wing 2, 3 or wing tip device 7 to help alleviate wing 'down-bending', as shown in FIGS. 21D and 22D.

Figure 23:
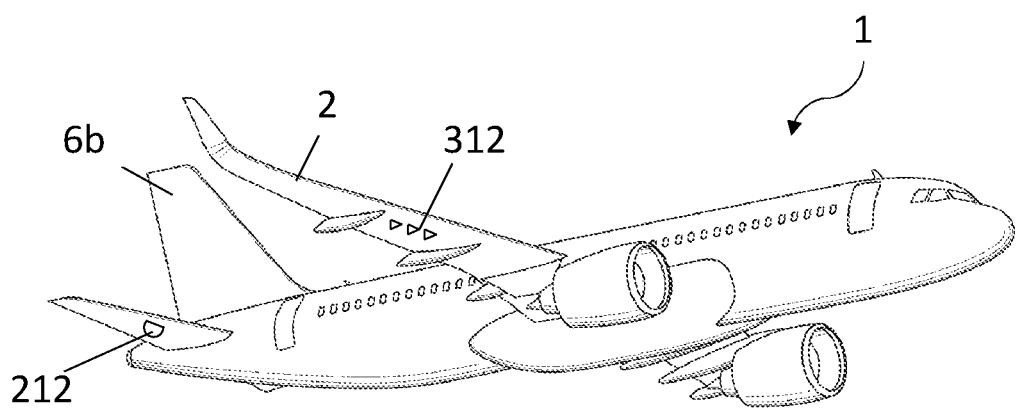
FIG. 23 shows an aircraft with multiple flow control devices.

It will be understood that the aircraft 1 may have any number of spoilers 12, 112, 212, 312, 412, 512, 612, 615, 617 arranged in any configuration. The spoilers 12, 112, 212, 312, 412, 512, 612, 615, 617 may be arranged on multiple aerodynamic surfaces on an aircraft 1 to help alleviate bending of the structures, as required. FIG. 23 shows an aircraft 1 with spoilers 312 arranged on the underside of wing 2, and a spoiler 212 arranged on the horizontal stabiliser 6a.

The activation threshold of each spoiler 12, 112, 212, 312, 412, 512, 612, 615, 617 may differ to suit a particular location or application. The length and curvature of the proximal end may be selected to passively actuate at a given activation threshold, whilst the configuration of the distal end is selected according to the flow characteristics when the spoiler is in the second state.

Whilst the examples have been described in regards to the function of spoilers 12, 112, 212, 312, 412, 512, 612, 615, 617 arranged on an aircraft 1, it will be understood that their application is not so limited and they may be used as a flow control device in a variety of applications. The flow control devices 12, 112, 212, 312, 412, 512, 612, 615, 617 may be located on any 3D cantilevered aerofoil, such as helicopter blades or a wind turbine blade in order to provide passive activation due to bending. Furthermore, the bending may be spanwise or chordwise so as to cause spanwise strain or chordwise strain respectively.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A flow control device with a device aerodynamic surface arranged on a structure with a structure aerodynamic surface such that strain in the structure is at least partially transferred to the flow control device, the flow control device having a first state corresponding to a first shape of the device aerodynamic surface, and a second state corresponding to a second shape of the device aerodynamic surface,
   wherein the first state is a stable state of the flow control device and the second state is either a steady state or a second stable state of the flow control device,
   wherein the flow control device is arranged to rapidly transition from the first state to the second state when strain in the structure exceeds an activation threshold of the flow control device, and
   wherein in the second shape the device aerodynamic surface is depressed below the surrounding structure aerodynamic surface to define a recessed channel transverse to an oncoming airflow configured so that the oncoming airflow can flow into the recessed channel.

2. The flow control device on the structure according to claim 1, wherein the strain in the structure which is at least partially transferred to the flow control device and exceeds an activation threshold of the flow control device is in a direction transverse to an oncoming airflow direction.

3. The flow control device on the structure of claim 1, further comprising at least two of the flow control devices arranged spaced in the direction of the oncoming airflow, and with a duct formed in the structure beneath the structure aerodynamic surface, such that a first one of the two flow control devices forms a first opening to the duct when the device aerodynamic surface of the first flow device is depressed below the surrounding structure aerodynamic surface, and a second one of the two flow control devices forms a second opening to the duct when the device aerodynamic surface of the second flow device is depressed below the surrounding structure aerodynamic surface, so that the oncoming airflow can flow through the duct.

4. An aerofoil comprising a low pressure surface and a spoiler arranged on the low pressure surface, the spoiler having a rest position where it is substantially flush with the low pressure surface and an activated position where it protrudes from the low pressure surface and modifies the airflow over that surface;
  wherein the spoiler is a device having a stable state in the rest position and a stable or quasi-stable state in the activated position;
  the spoiler bends to move from the rest position to the activated position; and
  the coupling of the spoiler to the aerofoil transfers at least some strain from the aerofoil to the spoiler and the movement of the spoiler is triggered by the strain in the aerofoil crossing a threshold,
  wherein in the activated position the low pressure surface is depressed below the surrounding surface to define a recessed channel transverse to an oncoming airflow configured so that the oncoming airflow can flow into the recessed channel.

5. A flow control device with a device aerodynamic surface arranged on a structure with a structure aerodynamic surface such that strain in the structure is at least partially transferred to the flow control device, the flow control device having a first state corresponding to a first shape of the device aerodynamic surface, and a second state corresponding to a second shape of the device aerodynamic surface,
  wherein the first state is a stable state of the flow control device and the second state is either a steady state or a second stable state of the flow control device,
  wherein the flow control device is arranged to rapidly transition from the first state to the second state when strain in the structure exceeds an activation threshold of the flow control device,
  wherein the strain in the structure which is at least partially transferred to the flow control device and exceeds an activation threshold of the flow control device is in a direction transverse to an oncoming airflow direction, and
  wherein the flow control device has attached lateral sides and unattached fore and aft edges with respect to the airflow direction.

6. The flow control device on the structure of claim 5, wherein in the first shape the device aerodynamic surface is substantially flush with the structure aerodynamic surface.

7. The flow control device on the structure of claim 5, wherein in the second shape the device aerodynamic surface is bent away from the structure and towards an oncoming flow direction.

8. The flow control device on the structure of claim 5, wherein the activation threshold of the flow control device is tuneable.

9. The flow control device on a structure of claim 5, wherein the flow control device is configured to at least initially remain in the second, stable state when the strain in the structure decreases below the activation threshold.

10. The flow control device on the structure according to claim 5, further comprising a plurality of the flow control devices.

11. The flow control device on the structure of claim 5, wherein the device aerodynamic surface is generally rectangular in the first state, preferably wherein the short side of the rectangle extends generally parallel to an oncoming flow direction.

12. The flow control device on the structure of claim 5, wherein the flow control device is mono-stable or bi-stable.

13. The flow control device on the structure of claim 5, wherein the flow control device comprises anisotropic material.

14. The flow control device on the structure of claim 5, wherein the flow control device comprises a pre-stressed isotropic material.

15. The flow control device on the structure of claim 5, wherein the flow control device is configured such that the second, steady state is maintained only by the strain in the structure remaining above the activation threshold.

16. The flow control device on the structure of claim 15, wherein the flow control device is configured to return to the first state once the strain in the structure decreases below the activation threshold.

17. The flow control device on the structure of claim 5, wherein the flow control device has a proximal end towards an oncoming flow direction, and the proximal end of the flow control device is attached to or integrally formed with the structure.

18. The flow control device on the structure of claim 17, wherein the flow control device has a distal end opposite the proximal end, wherein the distal end is unattached to the structure such that the flow control device is cantilevered from the structure by its proximal end.

19. The flow control device on the structure according to claim 17, wherein the strain in the structure is at least partially transferred to the flow control device through the attached or integrally formed proximal end of the flow control device.

20. The flow control device on the structure according to claim 5, wherein in the second shape the device aerodynamic surface is spaced away from the structure to form a gap so that an oncoming airflow can flow through the gap between the flow control device and the structure.

21. The flow control device on the structure of claim 20, wherein in the second shape the device aerodynamic surface defines an archway for the oncoming airflow to pass through.

22. The flow control device on the structure of claim 20, wherein the flow control device is attached or integrally formed with the structure at at least two points.

23. The flow control device on the structure according to claim 5, wherein the structure forms part of an aerofoil.

24. The flow control device on the structure of claim 23 wherein the aerofoil is adapted to generate lift when moving relative to an air flow, and wherein in the second state the flow control device is configured to interact with the air flow around the aerofoil to reduce the lift generated by the aerofoil as compared with the lift generated by the aerofoil when the flow control device is in the first state.

25. The flow control device on the structure of claim 23, wherein the flow control device is a lift spoiler.

26. The flow control device on the structure of claim 23, wherein the flow control device is arranged at a transition region between an aircraft wing and an upwardly projecting portion of a wing tip device.

27. The flow control device on the structure of claim 23, wherein the structure aerodynamic surface is a low pressure surface of the aerofoil.

28. The flow control device on the structure of claim 27, wherein the structure having the low pressure surface is configured to support compressive strain when the aerofoil generates lift, and the flow control device is configured to rapidly transition from the first state to the second state when compressive strain in the structure exceeds the activation threshold due to the lift generated by the aerofoil.

* * * * *